United States Patent
Gunasekara

(10) Patent No.: US 10,560,772 B2
(45) Date of Patent: *Feb. 11, 2020

(54) APPARATUS AND METHODS FOR SELECTIVE DATA NETWORK ACCESS

(71) Applicant: Time Warner Cable Enterprises LLC, St. Louis, MO (US)

(72) Inventor: Don Gunasekara, Reston, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,427

(22) Filed: May 25, 2018

(65) Prior Publication Data
US 2018/0279033 A1  Sep. 27, 2018

Related U.S. Application Data

(62) Division of application No. 14/959,885, filed on Dec. 4, 2015, now Pat. No. 9,986,578.

(51) Int. Cl.
*H04W 4/00* (2018.01)
*H04R 1/10* (2006.01)
(Continued)

(52) U.S. Cl.
CPC ....... *H04R 1/1016* (2013.01); *H04L 61/2514* (2013.01); *H04W 60/00* (2013.01);
(Continued)

(58) Field of Classification Search
None
See application file for complete search history.

(56) References Cited

U.S. PATENT DOCUMENTS

| 5,313,454 A | 5/1994 | Bustini et al. |
| 5,369,707 A | 11/1994 | Follendore, III |

(Continued)

FOREIGN PATENT DOCUMENTS

| EP | 1139198 A2 | 10/2001 |
| EP | 2113860 A1 | 11/2009 |

(Continued)

OTHER PUBLICATIONS

5C Digital Transmission Content Protection White Paper, Hitachi, Ltd., et al., dated Jul. 14, 1998, 15 pages.
(Continued)

*Primary Examiner* — Bob A Phunkulh
(74) *Attorney, Agent, or Firm* — Gazdzinski & Associates, PC

(57) ABSTRACT

Wireless data network access architecture and methods enabling location-specific and/or user-specific provision of services or resources. In one embodiment, an end-user device makes a request for service within a wireless LAN (WLAN). A wireless access point (WAP) controller/policy server determines whether the user device meets criteria for a first user status or a second user status, and assigns the appropriate status to an identifier of the end-user device. When the user device is assigned the first user status, the user device is provided network access according to e.g., a first permissible bandwidth allocation. Otherwise, the user device is provided network access according to a second, different bandwidth allocation. The first and second user status may be assigned based on a location of the user device within e.g., a venue, a class of end-user device, end user application, an access pass associated with the user device, or yet other criteria.

20 Claims, 13 Drawing Sheets

(51) Int. Cl.
  *H04W 60/00* (2009.01)
  *H04L 29/12* (2006.01)
  *B29C 33/38* (2006.01)
  *H04W 4/06* (2009.01)
  *H04W 48/20* (2009.01)
  *H04W 72/10* (2009.01)
  *H04W 4/08* (2009.01)

(52) U.S. Cl.
  CPC ...... *B29C 33/3835* (2013.01); *H04L 61/6022* (2013.01); *H04R 2201/105* (2013.01); *H04R 2225/025* (2013.01); *H04R 2225/77* (2013.01); *H04R 2460/15* (2013.01); *H04W 4/00* (2013.01); *H04W 4/06* (2013.01); *H04W 4/08* (2013.01); *H04W 48/20* (2013.01); *H04W 72/10* (2013.01)

(56) References Cited

U.S. PATENT DOCUMENTS

| | | |
|---|---|---|
| 5,528,284 A | 6/1996 | Iwami et al. |
| 5,577,209 A | 11/1996 | Boyle et al. |
| 5,708,961 A | 1/1998 | Hylton et al. |
| 5,715,403 A | 2/1998 | Stefik |
| 5,774,170 A | 6/1998 | Hite et al. |
| 5,787,172 A | 7/1998 | Arnold |
| 5,818,438 A | 10/1998 | Howe et al. |
| 5,828,832 A | 10/1998 | Holden et al. |
| 5,862,312 A | 1/1999 | Mann et al. |
| 5,870,474 A | 2/1999 | Wasilewski et al. |
| 5,878,324 A | 3/1999 | Borth et al. |
| 5,897,635 A | 4/1999 | Torres et al. |
| 5,926,205 A | 7/1999 | Krause et al. |
| 5,935,206 A | 8/1999 | Dixon et al. |
| 5,982,412 A | 11/1999 | Nulty |
| 6,002,393 A | 12/1999 | Hite et al. |
| 6,009,103 A | 12/1999 | Woundy |
| 6,092,178 A | 7/2000 | Jindal et al. |
| 6,128,316 A | 10/2000 | Takeda et al. |
| 6,134,532 A | 10/2000 | Lazarus et al. |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,169,728 B1 | 1/2001 | Perreault et al. |
| 6,181,697 B1 | 1/2001 | Nurenberg et al. |
| 6,211,901 B1 | 4/2001 | Imajima et al. |
| 6,212,636 B1 | 4/2001 | Boyle et al. |
| 6,219,710 B1 | 4/2001 | Gray et al. |
| 6,219,840 B1 | 4/2001 | Corrigan et al. |
| 6,233,341 B1 | 5/2001 | Riggins |
| 6,233,687 B1 | 5/2001 | White |
| 6,240,553 B1 | 5/2001 | Son et al. |
| 6,249,680 B1 | 6/2001 | Wax et al. |
| 6,256,393 B1 | 7/2001 | Safadi et al. |
| 6,259,701 B1 | 7/2001 | Shur et al. |
| 6,266,421 B1 | 7/2001 | Domyo et al. |
| 6,330,609 B1 | 12/2001 | Garofalakis et al. |
| 6,353,626 B1 | 3/2002 | Sunay et al. |
| 6,378,130 B1 | 4/2002 | Adams |
| 6,434,141 B1 | 8/2002 | Oz et al. |
| 6,456,716 B1 | 9/2002 | Arnold |
| 6,463,585 B1 | 10/2002 | Hendricks et al. |
| 6,498,783 B1 | 12/2002 | Lin |
| 6,519,062 B1 | 2/2003 | Yoo |
| 6,523,696 B1 | 2/2003 | Saito et al. |
| 6,590,865 B1 | 7/2003 | Ibaraki et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,687,735 B1 | 2/2004 | Logston et al. |
| 6,694,145 B2 | 2/2004 | Riikonen et al. |
| 6,711,148 B1 | 3/2004 | Hills |
| 6,718,551 B1 | 4/2004 | Swix et al. |
| 6,738,978 B1 | 5/2004 | Hendricks et al. |
| 6,742,116 B1 | 5/2004 | Matsui et al. |
| 6,760,768 B2 | 7/2004 | Holden et al. |
| 6,763,391 B1 | 7/2004 | Ludtke |
| 6,782,550 B1 | 8/2004 | Cao |
| 6,785,810 B1 | 8/2004 | Lirov et al. |
| 6,788,676 B2 | 9/2004 | Partanen et al. |
| 6,799,047 B1 | 9/2004 | Bahl et al. |
| 6,807,573 B2 | 10/2004 | Saito et al. |
| 6,813,505 B2 | 11/2004 | Walley et al. |
| 6,842,783 B1 | 1/2005 | Boivie et al. |
| 6,859,535 B1 | 2/2005 | Tatebayashi et al. |
| 6,891,841 B2 | 5/2005 | Leatherbury et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,576 B2 | 12/2005 | Giobbi |
| 6,975,730 B1 | 12/2005 | Kuroiwa et al. |
| 6,985,355 B2 | 1/2006 | Allirot |
| 6,986,156 B1 | 1/2006 | Rodriguez et al. |
| 6,996,544 B2 | 2/2006 | Sellars et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,016,963 B1 | 3/2006 | Judd et al. |
| 7,017,189 B1 | 3/2006 | Demello et al. |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,573 B1 | 6/2006 | Brooks et al. |
| 7,072,950 B2 | 7/2006 | Toft |
| 7,073,199 B1 | 7/2006 | Raley |
| 7,075,945 B2 | 7/2006 | Arsenault et al. |
| 7,086,077 B2 | 8/2006 | Giammaressi |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,143,431 B1 | 11/2006 | Eager et al. |
| 7,149,772 B1 | 12/2006 | Kalavade |
| 7,154,912 B2 | 12/2006 | Chong et al. |
| 7,165,268 B1 | 1/2007 | Moore et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,228,555 B2 | 6/2007 | Schlack |
| 7,237,112 B1 | 6/2007 | Ishiguro et al. |
| 7,242,960 B2 | 7/2007 | Van et al. |
| 7,248,694 B2 | 7/2007 | Husemann et al. |
| 7,254,608 B2 | 8/2007 | Yeager et al. |
| 7,257,227 B2 | 8/2007 | Chen et al. |
| 7,266,726 B1 | 9/2007 | Ladd et al. |
| 7,289,534 B1 | 10/2007 | Bailey et al. |
| 7,299,502 B2 | 11/2007 | Schmeling et al. |
| 7,305,460 B2 | 12/2007 | Park |
| 7,308,415 B2 | 12/2007 | Kimbrel et al. |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,334,044 B1 | 2/2008 | Allen |

(56) References Cited

U.S. PATENT DOCUMENTS

| | | |
|---|---|---|
| 7,340,759 B1 | 3/2008 | Rodriguez |
| 7,346,688 B2 | 3/2008 | Allen et al. |
| 7,353,543 B2 | 4/2008 | Ohmori et al. |
| 7,363,371 B2 | 4/2008 | Kirby et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,379,494 B2 | 5/2008 | Raleigh et al. |
| 7,409,546 B2 | 8/2008 | Platt |
| 7,457,520 B2 | 11/2008 | Rossetti et al. |
| 7,464,179 B2 | 12/2008 | Hodges et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,506,367 B1 | 3/2009 | Ishibashi |
| 7,551,574 B1 * | 6/2009 | Peden, II ............. H04L 63/102 370/310 |
| 7,567,565 B2 | 7/2009 | La |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,860,507 B2 | 12/2010 | Kalika et al. |
| 7,865,440 B2 | 1/2011 | Jaquette |
| 7,870,599 B2 | 1/2011 | Pemmaraju |
| 7,925,592 B1 | 4/2011 | Issa et al. |
| 7,930,558 B2 | 4/2011 | Hori |
| 7,930,715 B2 | 4/2011 | Hendricks et al. |
| 7,954,131 B2 | 5/2011 | Cholas et al. |
| 7,983,418 B2 | 7/2011 | Oyama et al. |
| 8,041,785 B2 | 10/2011 | Mazur et al. |
| 8,084,792 B2 | 12/2011 | Lehmann et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | La et al. |
| 8,306,634 B2 | 11/2012 | Nguyen et al. |
| 8,332,370 B2 | 12/2012 | Gattegno et al. |
| 8,341,242 B2 | 12/2012 | Dillon et al. |
| 8,442,265 B1 | 5/2013 | Bosworth et al. |
| 8,583,484 B1 | 11/2013 | Chalawsky et al. |
| 8,713,623 B2 | 4/2014 | Brooks |
| 8,842,615 B1 | 9/2014 | Kalbag et al. |
| 8,862,155 B2 | 10/2014 | Stern et al. |
| 8,866,911 B1 | 10/2014 | Sivertsen |
| 8,898,270 B1 | 11/2014 | Stack et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,215,423 B2 | 12/2015 | Kimble et al. |
| 9,300,919 B2 | 3/2016 | Cholas et al. |
| 9,906,838 B2 | 2/2018 | Cronk et al. |
| 9,918,345 B2 | 3/2018 | Gunasekara et al. |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0030785 A1 | 10/2001 | Pangrac et al. |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0013772 A1 | 1/2002 | Peinado |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0049902 A1 | 4/2002 | Rhodes |
| 2002/0054589 A1 | 5/2002 | Ethridge et al. |
| 2002/0055978 A1 | 5/2002 | Joon-Bo et al. |
| 2002/0056125 A1 | 5/2002 | Hodge et al. |
| 2002/0059619 A1 | 5/2002 | Lebar |
| 2002/0062440 A1 | 5/2002 | Akama |
| 2002/0063621 A1 | 5/2002 | Tseng et al. |
| 2002/0066033 A1 | 5/2002 | Dobbins et al. |
| 2002/0077984 A1 | 6/2002 | Ireton |
| 2002/0087976 A1 | 7/2002 | Kaplan et al. |
| 2002/0123928 A1 | 9/2002 | Eldering et al. |
| 2002/0126654 A1 | 9/2002 | Preston et al. |
| 2002/0129358 A1 | 9/2002 | Buehl et al. |
| 2002/0129378 A1 | 9/2002 | Cloonan et al. |
| 2002/0147771 A1 | 10/2002 | Traversat et al. |
| 2002/0152299 A1 | 10/2002 | Traversat et al. |
| 2002/0152393 A1 | 10/2002 | Thoma et al. |
| 2002/0183985 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0002862 A1 | 1/2003 | Rodriguez et al. |
| 2003/0005453 A1 | 1/2003 | Rodriguez et al. |
| 2003/0007516 A1 | 1/2003 | Abramov et al. |
| 2003/0009681 A1 | 1/2003 | Harada et al. |
| 2003/0021421 A1 | 1/2003 | Yokota et al. |
| 2003/0041336 A1 | 2/2003 | Del et al. |
| 2003/0046560 A1 | 3/2003 | Inomata et al. |
| 2003/0046704 A1 | 3/2003 | Laksono et al. |
| 2003/0048380 A1 | 3/2003 | Tamura |
| 2003/0056217 A1 | 3/2003 | Brooks |
| 2003/0061619 A1 | 3/2003 | Giammaressi |
| 2003/0069965 A1 | 4/2003 | Ma et al. |
| 2003/0071117 A1 | 4/2003 | Meade |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0099212 A1 | 5/2003 | Anjum et al. |
| 2003/0114162 A1 | 6/2003 | Chheda et al. |
| 2003/0115267 A1 | 6/2003 | Hinton et al. |
| 2003/0139980 A1 | 7/2003 | Hamilton |
| 2003/0140227 A1 | 7/2003 | Asano et al. |
| 2003/0163697 A1 | 8/2003 | Pabla et al. |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0179773 A1 | 9/2003 | Mocek et al. |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0019691 A1 | 1/2004 | Daymond et al. |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0106403 A1 | 6/2004 | Mori et al. |
| 2004/0109569 A1 | 6/2004 | Ellison et al. |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133907 A1 | 7/2004 | Rodriguez et al. |
| 2004/0133923 A1 | 7/2004 | Watson et al. |
| 2004/0137918 A1 | 7/2004 | Varonen et al. |
| 2004/0146006 A1 | 7/2004 | Jackson |
| 2004/0181800 A1 | 9/2004 | Rakib et al. |
| 2004/0187159 A1 | 9/2004 | Gaydos et al. |
| 2004/0193609 A1 | 9/2004 | Phan et al. |
| 2004/0193680 A1 | 9/2004 | Gibbs et al. |
| 2004/0224425 A1 | 11/2004 | Gjerde et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |

(56) References Cited

U.S. PATENT DOCUMENTS

| | | |
|---|---|---|
| 2004/0268386 A1 | 12/2004 | Logan et al. |
| 2005/0005287 A1 | 1/2005 | Claussen |
| 2005/0007278 A1 | 1/2005 | Anson et al. |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039205 A1 | 2/2005 | Riedl |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0058112 A1 | 3/2005 | Lahey et al. |
| 2005/0060742 A1 | 3/2005 | Riedl et al. |
| 2005/0060745 A1 | 3/2005 | Riedl et al. |
| 2005/0065888 A1 | 3/2005 | Benaloh |
| 2005/0086683 A1 | 4/2005 | Meyerson |
| 2005/0086691 A1 | 4/2005 | Dudkiewicz et al. |
| 2005/0091173 A1 | 4/2005 | Alve |
| 2005/0097006 A1 | 5/2005 | Nyako |
| 2005/0108763 A1 | 5/2005 | Baran et al. |
| 2005/0111844 A1 | 5/2005 | Compton et al. |
| 2005/0114686 A1 | 5/2005 | Ball et al. |
| 2005/0114900 A1 | 5/2005 | Ladd et al. |
| 2005/0125832 A1 | 6/2005 | Jost et al. |
| 2005/0138357 A1 | 6/2005 | Swenson et al. |
| 2005/0168323 A1 | 8/2005 | Lenoir et al. |
| 2005/0169468 A1 | 8/2005 | Fahrny et al. |
| 2005/0172127 A1 | 8/2005 | Hartung et al. |
| 2005/0176444 A1 | 8/2005 | Tanaka |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0268107 A1 | 12/2005 | Harris et al. |
| 2005/0273629 A1 | 12/2005 | Abrams et al. |
| 2005/0278259 A1 | 12/2005 | Gunaseelan et al. |
| 2005/0289618 A1 | 12/2005 | Hardin |
| 2005/0289619 A1 | 12/2005 | Melby |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0020786 A1 | 1/2006 | Helms et al. |
| 2006/0020950 A1 | 1/2006 | Ladd et al. |
| 2006/0021004 A1 | 1/2006 | Moran et al. |
| 2006/0036750 A1 | 2/2006 | Ladd et al. |
| 2006/0041903 A1 | 2/2006 | Kahn et al. |
| 2006/0047801 A1 | 3/2006 | Haag et al. |
| 2006/0047957 A1 | 3/2006 | Helms et al. |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0154674 A1 | 7/2006 | Landschaft et al. |
| 2006/0161635 A1 | 7/2006 | Lamkin et al. |
| 2006/0165090 A1 | 7/2006 | Kalliola et al. |
| 2006/0165197 A1 | 7/2006 | Morita et al. |
| 2006/0168219 A1 | 7/2006 | Ahluwalia et al. |
| 2006/0171390 A1 | 8/2006 | La |
| 2006/0171423 A1 | 8/2006 | Helms et al. |
| 2006/0179138 A1 | 8/2006 | Van et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl et al. |
| 2006/0218632 A1 | 9/2006 | Corley et al. |
| 2006/0236131 A1 | 10/2006 | Vauclair |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0259927 A1 | 11/2006 | Acharya et al. |
| 2006/0277569 A1 | 12/2006 | Smith |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0076728 A1 | 4/2007 | Rieger et al. |
| 2007/0079381 A1 | 4/2007 | Hartung et al. |
| 2007/0086383 A1 | 4/2007 | Watanabe et al. |
| 2007/0089127 A1 | 4/2007 | Flickinger et al. |
| 2007/0094691 A1 | 4/2007 | Gazdzinski |
| 2007/0098178 A1 | 5/2007 | Raikar |
| 2007/0113243 A1 | 5/2007 | Brey |
| 2007/0115900 A1 | 5/2007 | Liang et al. |
| 2007/0121678 A1 | 5/2007 | Brooks et al. |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0204314 A1 | 8/2007 | Hasek et al. |
| 2007/0206799 A1 | 9/2007 | Wingert et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0233857 A1 | 10/2007 | Cheng et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0266395 A1 | 11/2007 | Lee et al. |
| 2007/0276925 A1 | 11/2007 | La et al. |
| 2007/0276926 A1 | 11/2007 | Lajoie et al. |
| 2007/0294178 A1 | 12/2007 | Pinder et al. |
| 2008/0008321 A1 | 1/2008 | Gagnon et al. |
| 2008/0008371 A1 | 1/2008 | Woods et al. |
| 2008/0021836 A1 | 1/2008 | Lao |
| 2008/0022012 A1 | 1/2008 | Wang |
| 2008/0037493 A1 | 2/2008 | Morton |
| 2008/0046542 A1 | 2/2008 | Sano et al. |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0101460 A1 | 5/2008 | Rodriguez |
| 2008/0103976 A1 | 5/2008 | Read et al. |
| 2008/0103977 A1 | 5/2008 | Khosravy et al. |
| 2008/0104634 A1 | 5/2008 | Gajdos et al. |
| 2008/0109307 A1 | 5/2008 | Ullah |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0134274 A1 | 6/2008 | Derrenberger et al. |
| 2008/0141317 A1 | 6/2008 | Radloff et al. |
| 2008/0141353 A1 | 6/2008 | Brown |
| 2008/0148362 A1 | 6/2008 | Gilder et al. |
| 2008/0155059 A1 | 6/2008 | Hardin et al. |
| 2008/0155614 A1 | 6/2008 | Cooper et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0182591 A1 | 7/2008 | Krikorian |
| 2008/0183705 A1 | 7/2008 | Shivaji-Rao et al. |
| 2008/0192820 A1 | 8/2008 | Brooks et al. |
| 2008/0212945 A1 | 9/2008 | Khedouri et al. |

(56) References Cited

U.S. PATENT DOCUMENTS

| | | |
|---|---|---|
| 2008/0222684 A1 | 9/2008 | Mukraj et al. |
| 2008/0229354 A1 | 9/2008 | Morris et al. |
| 2008/0235746 A1* | 9/2008 | Peters .............. H04N 7/17318 |
| | | 725/111 |
| 2008/0244667 A1 | 10/2008 | Osborne |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2009/0007234 A1 | 1/2009 | Birger et al. |
| 2009/0013210 A1 | 1/2009 | McIntosh et al. |
| 2009/0025027 A1 | 1/2009 | Craner |
| 2009/0025075 A1 | 1/2009 | Chow et al. |
| 2009/0028182 A1 | 1/2009 | Brooks et al. |
| 2009/0031371 A1 | 1/2009 | Munsell et al. |
| 2009/0064251 A1 | 3/2009 | Savoor et al. |
| 2009/0077620 A1* | 3/2009 | Ravi ................ H04L 63/102 |
| | | 726/1 |
| 2009/0083813 A1 | 3/2009 | Dolce et al. |
| 2009/0098861 A1 | 4/2009 | Kalliola et al. |
| 2009/0100459 A1 | 4/2009 | Riedl et al. |
| 2009/0102983 A1 | 4/2009 | Malone et al. |
| 2009/0119751 A1 | 5/2009 | Koga |
| 2009/0151006 A1 | 6/2009 | Saeki et al. |
| 2009/0170479 A1 | 7/2009 | Jarenskog |
| 2009/0182815 A1 | 7/2009 | Czechowski, III et al. |
| 2009/0185576 A1 | 7/2009 | Kisel et al. |
| 2009/0187939 A1 | 7/2009 | Lajoie |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0244290 A1 | 10/2009 | McKelvey et al. |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0292922 A1 | 11/2009 | Park |
| 2009/0293101 A1 | 11/2009 | Carter et al. |
| 2010/0014496 A1 | 1/2010 | Kalika et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0070867 A1 | 3/2010 | Lemmers |
| 2010/0081416 A1 | 4/2010 | Cohen |
| 2010/0082983 A1 | 4/2010 | Shah et al. |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0122288 A1 | 5/2010 | Minter et al. |
| 2010/0131973 A1 | 5/2010 | Dillon et al. |
| 2010/0138900 A1 | 6/2010 | Peterka et al. |
| 2010/0150027 A1 | 6/2010 | Atwal et al. |
| 2010/0151816 A1 | 6/2010 | Besehanic et al. |
| 2010/0159951 A1 | 6/2010 | Shkedi |
| 2010/0167743 A1 | 7/2010 | Palanki et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251305 A1 | 9/2010 | Kimble et al. |
| 2010/0287609 A1 | 11/2010 | Gonzalez et al. |
| 2010/0309051 A1 | 12/2010 | Moshfeghi |
| 2010/0312826 A1 | 12/2010 | Sarosi et al. |
| 2010/0313225 A1 | 12/2010 | Cholas et al. |
| 2010/0313226 A1 | 12/2010 | Cholas et al. |
| 2011/0015989 A1 | 1/2011 | Tidwell et al. |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0103374 A1 | 5/2011 | Lajoie et al. |
| 2011/0107389 A1 | 5/2011 | Chakarapani |
| 2011/0112717 A1 | 5/2011 | Resner |
| 2011/0116428 A1 | 5/2011 | Seong et al. |
| 2011/0138064 A1 | 6/2011 | Rieger et al. |
| 2011/0163888 A1 | 7/2011 | Goedde |
| 2011/0164753 A1 | 7/2011 | Dubhashi et al. |
| 2011/0167440 A1 | 7/2011 | Greenfield |
| 2011/0169977 A1 | 7/2011 | Masuda |
| 2011/0197070 A1 | 8/2011 | Mizrah |
| 2011/0206136 A1 | 8/2011 | Bekedam et al. |
| 2011/0213688 A1 | 9/2011 | Santos et al. |
| 2011/0219229 A1 | 9/2011 | Cholas et al. |
| 2011/0225619 A1 | 9/2011 | Kesireddy et al. |
| 2011/0235577 A1 | 9/2011 | Hintermeister et al. |
| 2011/0247029 A1 | 10/2011 | Yarvis et al. |
| 2011/0252236 A1 | 10/2011 | De et al. |
| 2011/0252243 A1 | 10/2011 | Brouwer et al. |
| 2011/0286437 A1 | 11/2011 | Austin et al. |
| 2011/0299422 A1 | 12/2011 | Kim et al. |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0159603 A1 | 6/2012 | Queck |
| 2012/0167173 A1 | 6/2012 | Nadalin et al. |
| 2012/0202447 A1 | 8/2012 | Edge et al. |
| 2012/0203822 A1 | 8/2012 | Floyd et al. |
| 2012/0222081 A1 | 8/2012 | Schaefer et al. |
| 2012/0278654 A1 | 11/2012 | Shen et al. |
| 2012/0291062 A1 | 11/2012 | Pearson et al. |
| 2012/0302259 A1 | 11/2012 | Busch |
| 2012/0330759 A1 | 12/2012 | Aggarwal et al. |
| 2013/0016648 A1 | 1/2013 | Koskela et al. |
| 2013/0017794 A1 | 1/2013 | Kloper et al. |
| 2013/0045681 A1 | 2/2013 | Dua |
| 2013/0046623 A1 | 2/2013 | Moritz et al. |
| 2013/0081097 A1 | 3/2013 | Park et al. |
| 2013/0095848 A1 | 4/2013 | Gold et al. |
| 2013/0100818 A1 | 4/2013 | Qiu et al. |
| 2013/0176885 A1 | 7/2013 | Lee et al. |
| 2013/0235774 A1 | 9/2013 | Jo et al. |
| 2013/0254787 A1 | 9/2013 | Cox et al. |
| 2013/0260820 A1 | 10/2013 | Schmandt et al. |
| 2013/0308622 A1 | 11/2013 | Uhlik |
| 2013/0347089 A1 | 12/2013 | Bailey et al. |
| 2014/0010219 A1 | 1/2014 | Dor et al. |
| 2014/0046624 A1 | 2/2014 | Miettinen |
| 2014/0066098 A1 | 3/2014 | Stern et al. |
| 2014/0213256 A1 | 7/2014 | Meylan et al. |
| 2014/0215506 A1 | 7/2014 | Kalmes et al. |
| 2014/0242991 A1 | 8/2014 | Yanover et al. |
| 2014/0280901 A1 | 9/2014 | Balachandran et al. |
| 2014/0281489 A1 | 9/2014 | Peterka et al. |
| 2014/0282721 A1 | 9/2014 | Kuncl et al. |
| 2014/0283137 A1 | 9/2014 | Rebaud et al. |
| 2014/0308923 A1 | 10/2014 | Faulkner et al. |
| 2014/0309868 A1 | 10/2014 | Ricci |
| 2014/0328257 A1 | 11/2014 | Kamlani |
| 2014/0359649 A1 | 12/2014 | Cronk et al. |
| 2015/0009869 A1 | 1/2015 | Clegg |
| 2015/0036514 A1 | 2/2015 | Zhu et al. |
| 2015/0058883 A1 | 2/2015 | Tidwell et al. |
| 2015/0058909 A1 | 2/2015 | Miller et al. |
| 2015/0094098 A1 | 4/2015 | Stern et al. |
| 2015/0103685 A1 | 4/2015 | Butchko et al. |
| 2015/0106501 A1 | 4/2015 | Malets et al. |
| 2015/0106846 A1 | 4/2015 | Chen et al. |
| 2015/0146537 A1 | 5/2015 | Panaitopol et al. |
| 2015/0189377 A1 | 7/2015 | Wheatley et al. |
| 2015/0288617 A1 | 10/2015 | Dasher et al. |
| 2015/0288732 A1 | 10/2015 | Phillips et al. |
| 2015/0305082 A1 | 10/2015 | Elliott et al. |
| 2015/0365833 A1 | 12/2015 | Stafford et al. |
| 2016/0019103 A1 | 1/2016 | Basra |
| 2016/0057794 A1 | 2/2016 | Morita |
| 2016/0119939 A1 | 4/2016 | Himayat et al. |
| 2016/0127185 A1 | 5/2016 | McAllister et al. |

(56) References Cited

U.S. PATENT DOCUMENTS

| | | |
|---|---|---|
| 2016/0242071 A1 | 8/2016 | Chen et al. |
| 2016/0301525 A1 | 10/2016 | Canard et al. |
| 2017/0099327 A1 | 4/2017 | Negaluguli et al. |
| 2017/0164378 A1 | 6/2017 | Gunasekara et al. |
| 2017/0164416 A1 | 6/2017 | Yeddala et al. |
| 2017/0223536 A1 | 8/2017 | Gupta et al. |
| 2017/0257750 A1 | 9/2017 | Gunasekara et al. |
| 2017/0265084 A1 | 9/2017 | Clegg |

FOREIGN PATENT DOCUMENTS

| | | | |
|---|---|---|---|
| GB | 2381709 A | 5/2003 | |
| JP | H08263440 A | 10/1996 | |
| JP | 2000156676 A | 6/2000 | |
| JP | 2000332746 A | 11/2000 | |
| JP | 2001243707 A | 9/2001 | |
| JP | 2001274786 A | 10/2001 | |
| JP | 2001274788 A | 10/2001 | |
| JP | 2001285821 A | 10/2001 | |
| JP | 2002163396 A | 6/2002 | |
| JP | 2002352094 A | 12/2002 | |
| JP | 2003058657 A | 2/2003 | |
| JP | 2003162600 A | 6/2003 | |
| JP | 2003233690 A | 8/2003 | |
| JP | 2003248508 A | 9/2003 | |
| JP | 2003296484 A | 10/2003 | |
| JP | 2003348508 A | 12/2003 | |
| JP | 2004030111 A | 1/2004 | |
| JP | 2004072721 A | 3/2004 | |
| JP | 2004120736 A | 4/2004 | |
| JP | 2004120738 A | 4/2004 | |
| JP | 2004303111 A | 10/2004 | |
| JP | 2005506627 A | 3/2005 | |
| JP | 2005519365 A | 6/2005 | |
| JP | 2005519501 A | 6/2005 | |
| JP | 2005339093 A | 12/2005 | |
| JP | 2006185473 A | 7/2006 | |
| JP | 2006311267 A | 11/2006 | |
| JP | 2007020144 A | 1/2007 | |
| JP | 2008005047 A | 1/2008 | |
| JP | 2008015936 A | 1/2008 | |
| JP | 2008021293 A | 1/2008 | |
| JP | 2008507905 A | 3/2008 | |
| JP | 2008167018 A | 7/2008 | |
| JP | 2008186272 A | 8/2008 | |
| JP | 2008206039 A | 9/2008 | |
| JP | 2009071786 A | 4/2009 | |
| JP | 2009515238 A | 4/2009 | |
| JP | 2009176060 A | 8/2009 | |
| JP | 2009211632 A | 9/2009 | |
| JP | 2010502109 A | 1/2010 | |
| JP | 2010079902 A | 4/2010 | |
| JP | 2012505436 A | 3/2012 | |
| JP | 2012523614 A | 10/2012 | |
| WO | WO-0103410 A1 | 1/2001 | |
| WO | WO-0110125 A1 | 2/2001 | |
| WO | WO-0137479 A1 | 5/2001 | |
| WO | WO-0169842 A1 | 9/2001 | |
| WO | WO-0177778 A2 | 10/2001 | |
| WO | WO-0213032 A1 | 2/2002 | |
| WO | WO-0221841 A1 | 3/2002 | |
| WO | WO-0242966 A1 | 5/2002 | |
| WO | WO-02080556 A1 | 10/2002 | |
| WO | WO-03038704 A1 | 5/2003 | |
| WO | WO-03087799 A1 | 10/2003 | |
| WO | WO-03093944 A2 | 11/2003 | |
| WO | WO-2004027622 A2 | 4/2004 | |
| WO | WO-2005015422 A1 | 2/2005 | |
| WO | WO-2006020141 A2 | 2/2006 | |
| WO | WO-2008080556 A1 | 7/2008 | |
| WO | WO-2009020476 A2 | 2/2009 | |
| WO | WO-2012021245 A1 | 2/2012 | |

OTHER PUBLICATIONS

Cantor, et al., Assertions and Protocols for the OASIS Security Assertion Markup Language (SAML) V2.0, OASIS Standard, Mar. 15 2005. Document ID: saml-core-2.0-os (http://docs.oasis-open.org/security/saml/v2.0/saml-core-2.0-os.pdf).

Cantor, et al., Bindings for the OASIS Security Assertion Markup Language (SAML) V2.0, OASIS Standard, Mar. 2005, Document ID saml-bindings-2.0-os ,(http://docs.oasis-open.org/security/saml/v2.0/saml-bindings-2.0-os.pdf).

Cisco Intelligent Network Architecture for Digital Video—SCTE Cable-Tec Expo 2004 information page, Orange County Convention Center, Jun. 2004, 24 pages.

DCAS Authorized Service Domain, Version 1.2, dated Nov. 4, 2008, 58 pages.

DCAS Licensed Specification Abstracts, CableLabs Confidential Information, Jan. 12, 2006, 4 pages.

Deering et al., Internet Protocol, Version 6 (Ipv6) Specification, IETF RFC 2460 (Dec. 1998).

Digital Video Broadcasting (DVB); DVB SimulCrypt; Part 1: "Head-end architecture and synchronization" Technical Specification— ETSI TS 101 197 V1.2.1 (Feb. 2002), 40 pages.

DVB (Digital Video Broadcasting), DVB Document A045 Rev. 3, Jul. 2004, "Head-end Implementation of SimulCrypt," 289 pages.

Federal Information Processing Standards Publication, US FIPS PUB 197, Nov. 26, 2001, "Advanced Encryption Standards (AES)," 47 pages.

Gomez, Conserving Transmission Power in Wireless Ad Hoc Networks, 2001, Network Protocols.

Griffith, et al.,Resource Planning and Bandwidth Allocation in Hybrid Fiber-Coax Residential Networks, National Institute of Standards and Technology (NIST), 10 pages, no date.

Gupta V., et al., "Bit-Stuffing in 802.11 Beacon Frame: Embedding Non-Standard Custom Information," International Journal of Computer Applications, Feb. 2013, vol. 63 (2), pp. 6-12.

High-bandwidth Digital Content Protection System, Revision 1.091, dated Apr. 22, 2003, Digital Content Protection LLC Draft, 78 pages.

Internet Protocol DARPA Internet Program Protocol Specification, IETF RFC 791 (Sep. 1981).

Kanouff, Communications Technology: Next-Generation Bandwidth Management—The Evolution of the Anything-to-Anywhere Network, 8 pages, Apr. 1, 2004.

Marusic, et al., "Share it!—Content Transfer in Home-to-Home Networks." IEEE MELECON 2004, May 12-15, 2004, Dubrovnik, Croatia.

Media Server; 1 Device Template Version 1.01 Jun. 25, 2002.

Miao , et al., "Distributed interference-aware energy-efficient power optimization," IEEE Transactions on Wireless Communications, Apr. 2011, vol. 10 (4), pp. 1323-1333.

Motorola DOCSIS Cable Module DCM 2000 specifications, 4 pages, copyright 2001.

OpenCable Application Platform Specification, OCAP 2.0 Profile, OC-SP-OCAP2.0-I01-020419, Apr. 19, 2002.

OpenCable Application Platform Specifications, OCAP Extensions, OC-SP-OCAP—HNEXT-I03-080418, 2005-2008.

OpenCable Host Device, Core Functional Requirements, OC-SP-HOST-CFR-I13-030707, Jul. 7, 2003.

OpenCable, HOST-POD Interface Specification, OC-SP-HOSTPOD-IF-I13-030707, Jul. 7, 2003.

OpenCable Specification, Home Networking Protocol 2.0, OC-SP-HNP2.0-I01-08418, 2007.

OpenCable Specifications, Home Networking Security Specification, OC-SP-HN-SEC-DO1-081027, draft (Oct. 27, 2008).

OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).

OpenVision Session Resource Manager features and information, 2 pages, no date, (http://www.imake.com/hopenvision).

Primergy BX300 Switch Blade user's manual, Fujitsu Corp., Sep. 30, 2002, first edition, pp. 1 to 20.

(56) References Cited

OTHER PUBLICATIONS

Real System Media Commerce Suite (Technical White Paper), at http://docs.real.com/docs/drm/DRM.sub-WP1.pdf, 12 pages, Nov. 2001.
Van Moffaert, A., et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.
Zhang, et al., "A Flexible Content Protection System for Media-On-Demand" Multimedia Software Engineering, 2002 Proceedings. Fourth International Symposium on Dec. 11-13, 2002, Piscataway, NJ, USAA, IEEE, Dec. 11, 2002, pp. 272-277, XP010632760ISBN: 978-0-7695-1857-2.

\* cited by examiner

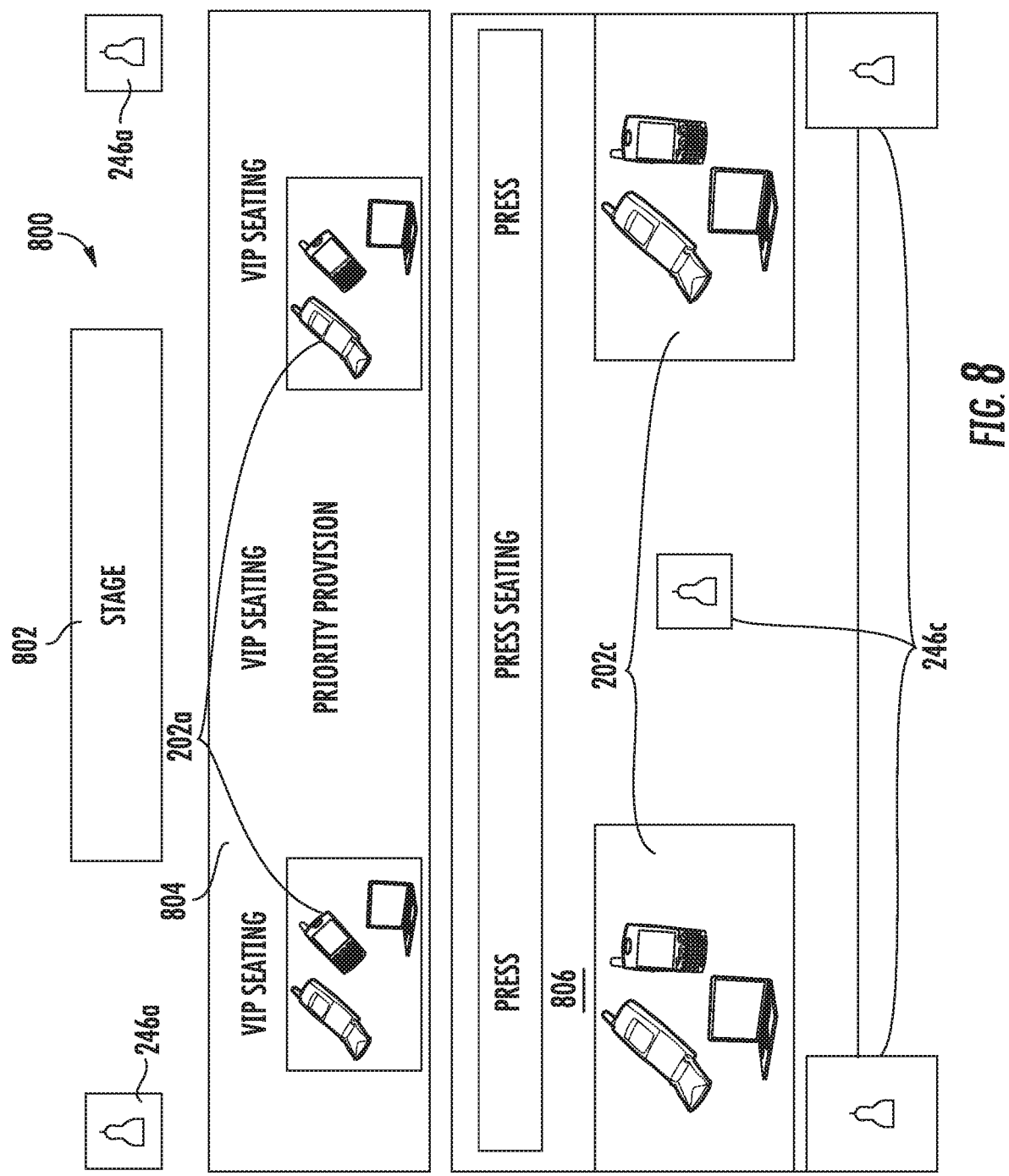

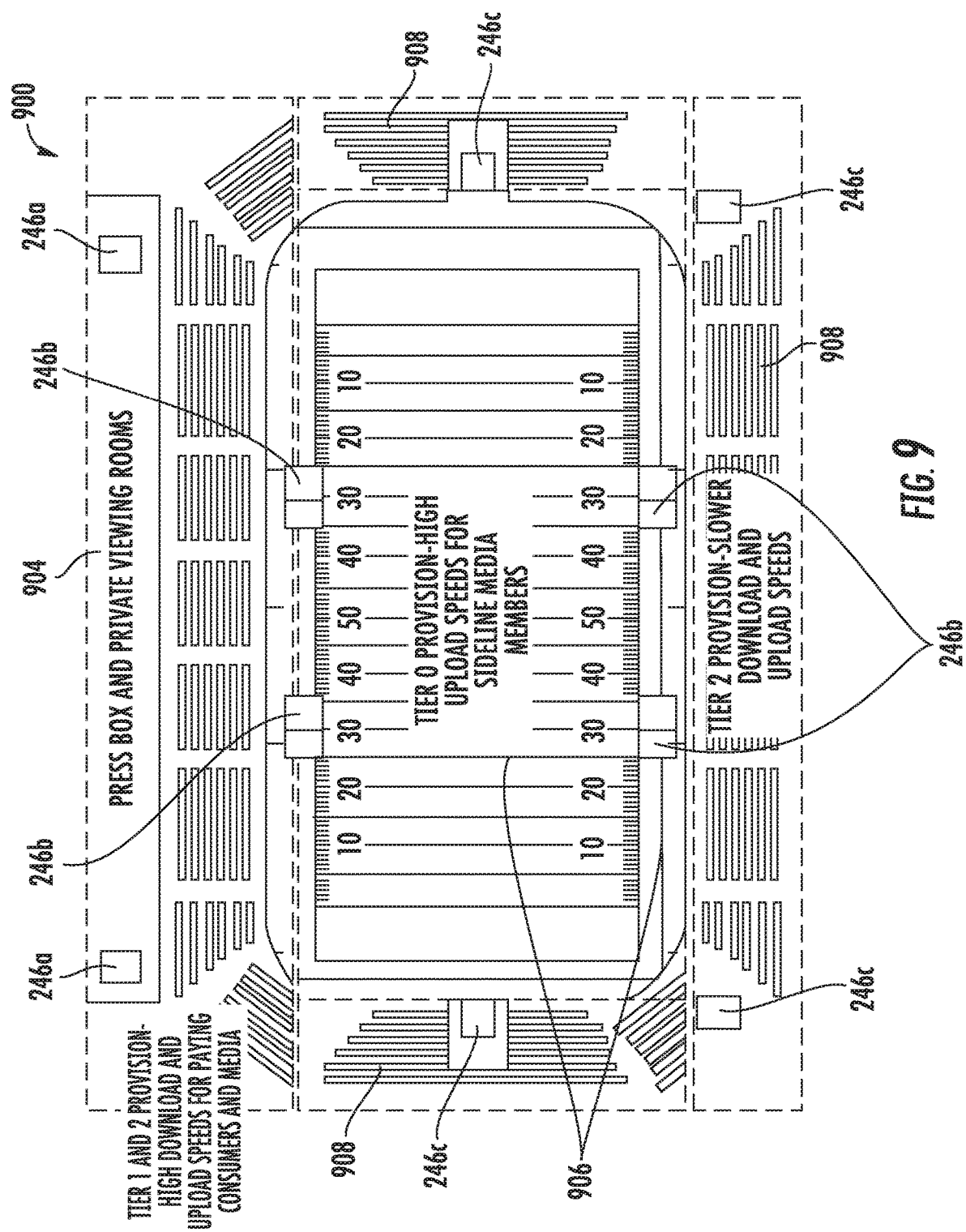

APPARATUS AND METHODS FOR SELECTIVE DATA NETWORK ACCESS

PRIORITY AND RELATED APPLICATIONS

The present application is a divisional of and claims priority to co-owned U.S. patent application Ser. No. 14/959,885 of the same title and filed on Dec. 4, 2015, issuing as U.S. Pat. No. 9,986,578 on May 29, 2018, which is herein incorporated by reference in its entirety. Further, the present application is generally related to the subject matter of co-pending and co-owned U.S. patent application Ser. No. 14/534,067 filed Nov. 5, 2014 and entitled "METHODS AND APPARATUS FOR DETERMINING AN OPTIMIZED WIRELESS INTERFACE INSTALLATION CONFIGURATION," Ser. No. 14/302,313 filed Jun. 11, 2014 and entitled "METHODS AND APPARATUS FOR ACCESS POINT LOCATION," and Ser. No. 14/959,948 filed on Dec. 4, 2015 and entitled "APPARATUS AND METHOD FOR WIRELESS NETWORK EXTENSIBILITY AND ENHANCEMENT," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of delivery of digital media data (e.g., text, video, audio, image files, and/or data files such as executables or other data structures) over data delivery networks, and specifically in one exemplary aspect to apparatus and methods for controlling selectable degrees of access of end-user devices to data delivery networks.

2. Description of Related Technology

In many public and private locations/venues, such as e.g., sports arenas, conference centers, hotels, concert halls, airports, etc., wireless networks are provided for connection of end-user devices (e.g., mobile and/or personal computing devices such as smartphones, tablets, laptops, etc.) to data delivery networks, including unmanaged networks such as the Internet. Such wireless networks may typically employ, e.g., access points (APs) and other infrastructure compliant with one or more IEEE 802.11 standards (so-called "Wi-Fi"). Such provided wireless networks, however, have a limited degree of access and/or consumable bandwidth capacity that can be made available to the users. Moreover, in such locations, there are potentially thousands of users that may attempt to access the provided wireless networks via their personal devices, sometimes at or nearly at the same time (such as where an event occurs, and the wireless users wish to engage in reporting or social media communications regarding the event). Among the pool of users, it may be desirable allow a selected group of users to have a greater degree of access (e.g., greater permissible bandwidth consumption, "head-of-the-line" privileges for the same amount of bandwidth as others, etc.). For example, some subset of the larger group may have valid reasons for requiring such enhanced access (e.g., the types or quantity of information they are sending or receiving may dictate a greater share of available bandwidth, and/or such head-of-the-line privileges due to e.g., urgency or time sensitivity).

Moreover, in that most users of wireless (and in fact other) networks typically are quite asymmetric in their uses (e.g., download bandwidth demanded is typically prevalent over upload bandwidth demanded), extant networks will often allocate more available network and backbone bandwidth to downstream channels for e.g., download, so as to mitigate user delays and loss of user experience. However, the foregoing paradigm may not be applicable in all cases, and in fact, situations may exist where required upstream/upload bandwidth (including that from multiple wireless users to one or more base stations or access points) far outstrips the downstream/download bandwidth, especially at fairly discrete points in time.

Without proper management of network access and parameters relating thereto, such scenarios as noted supra can result in the wireless access corollary of a "traffic jam"; access granted to only a subset of users in e.g., "first come, first served" fashion, with significant bandwidth limitation on each of the users who are lucky enough to obtain access. Clearly, the foregoing approach is not optimal, and results in significant user frustration, especially with the user's service provider.

One current solution for providing a sufficient degree of network access to a selected subset of a larger group of users is to exclude other (non-selected) users from network access. For example, a network can be password protected and the password distributed only to the selected group. These strategies may thus in certain cases provide a necessary degree of access to the selected group of users, yet none of these conventional solutions allows for, inter alia, other users to have a lower degree of access (e.g., access that does not interrupt uplink and/or downlink usage of the selected group of users) to the data network.

Additionally, any extant solutions that could address the foregoing problems require significant "intelligence" at the wireless access point or further up into the supporting distribution network; i.e., the wireless access point must be able to conduct evaluation of the requesting user device and/or user account, which necessitates use of a more complex device, and greater analytical capability in "sniffing" or examining packets and various aspects of the content or other data being transmitted or received by the requesting user (e.g., at higher layers within the protocol stack of the WAP or any associated controller). For example, were access privileges to be determined based on user ID or credentials alone, traffic associated with that user could not be easily identified, especially by a comparatively "dumb" wireless access point (WAP) or controller, and hence would require significant additional signaling and overhead to process selected or high-priority user requests or traffic, such as in maintaining QoS for traffic of the user.

Based on the foregoing, it is clear that while prior art solutions have generally recognized the need for providing network access to a selected group from a pool of users, there is a need for apparatus and methods that provide a greater degree of data network access (e.g., a greater uplink/downlink bandwidth), and control and configurability thereof, to a subset (e.g., selected group) of users, such as within a specific location/venue where many users are aggregated. In certain cases, it would further be desirable to provide a "best effort" degree of data network access (e.g., in some instances, a lesser uplink/downlink bandwidth depending on availability of the network) to other users within the same location/venue as well (as contrasted with provision of a high level of service to the "selected" users, and little or no service to others).

Ideal solutions would also be compatible with standardized hardware/software/operating systems, and be able to be implemented quickly with low development and resource overhead.

SUMMARY

The present disclosure addresses the foregoing needs by providing, inter alia, methods and apparatus for providing selectable degrees of data network access to end-user devices within e.g., a location/venue.

In a first aspect, a controller apparatus is disclosed. In one embodiment, the controller apparatus includes a processor apparatus configured to execute at least one computer program; a storage apparatus configured to store data, the comprising a user status that is at least one of (i) a first user status associated with a first permissible bandwidth consumption, and/or (ii) a second user status associated with a second permissible bandwidth consumption, the second permissible consumption being less than the first permissible consumption; a first data interface in data communication with the processor apparatus and configured for signal communication with a local area wireless network; a second interface data communication with the processor apparatus and configured for signal communication with a network entity of managed content delivery network (CDN); and a computer-readable storage apparatus having at least one computer program comprising a plurality of non-transitory computer readable instructions.

In one variant, the instructions are configured to, when executed by the processor apparatus, cause the apparatus to: receive a first connection request from a first user device via the first interface; determine that the first user device has been associated with the first user status; assign the first permissible bandwidth to the first user device when the first user device is associated with the first user status; provide access to the CDN via the second interface for the first user device consistent with the first permissible bandwidth consumption; receive a second connection request from a second user device via the first interface; determine that the second user device has been associated with the second user status; assign the second permissible bandwidth consumption to the second user device when the second user device is associated with the second user status; and provide access to the CDN via the second interface for the second user device consistent with the second permissible bandwidth consumption.

In another variant, the first user status and the second user status are assigned, respectively, based on respective ones of a location within a venue of each of the first user device and the second user device, the respective ones of the location being one of a higher priority area and a lower priority area.

In a further variant, the first and second user requests respectively comprise first and second media access control (MAC) values associated with the first and second user devices, and the first and second user statuses are respectively assigned based at least on the first and second MAC values; and the controller apparatus is further configured to determine the respective ones of the locations of the first and second user devices based at least on MAC data relating to respective wireless access points (WAPs) associated with the first and second user devices.

In yet another variant, the first user device is in signal communication with a first wireless access point located in the higher priority area and the second user device is in signal communication with a second wireless access point located in the lower priority area; and the first user status is associated with the first wireless access point and the second user status is associated with the second wireless access point. The first wireless access point has a first media access control (MAC) address detectable by the controller apparatus and the second wireless access point has a second MAC address detectable by the controller apparatus; and the first user status is associated with the first MAC address and the second user status is associated with the second MAC address.

In another variant, the first user status and the second user status are assigned, respectively, based on a class of end-user application of each of the first user device and the second user device, the class of end user application being one of a higher bandwidth consumption application class and a lower bandwidth consumption application class.

In another embodiment, the controller apparatus includes: a processor apparatus configured to execute at least one computer program; a storage device in data communication with the processor apparatus; a first data interface in data communication with the processor apparatus and configured for signal communication with a wireless local area network (WLAN) access point; a second interface data communication with the processor apparatus and configured for signal communication with a network entity of managed content delivery network (CDN); and a computer-readable storage apparatus having at least one computer program comprising a plurality of non-transitory computer readable instructions.

In one variant, the instructions are configured to, when executed by the processor apparatus, cause the apparatus to: receive a first service request from a first user device via the first interface, the first service request comprising a device-specific identifier of the first user device; utilize at least a portion of the first service request to authenticate, within the CDN, the first user device as having a privilege associated with the WLAN; receive data indicative of the privilege from the CDN and store the data in the storage device; and subsequently utilize the stored data to cause the access point to recognize subsequent service requests from the first user device, and implement one or more policies for data access according to the privilege.

In another variant, the device-specific identifier comprises a MAC address, and the one or more policies comprises increased upstream data bandwidth for the first user device.

In a further variant, the device-specific identifier comprises a MAC address, use of the MAC address obviating the WLAN or CDN from having to evaluate data contained within a payload of the subsequent service requests for determination of policy.

In another aspect, a method of providing wireless local area network (WLAN)-based services to a plurality of users within a prescribed location is disclosed. In one embodiment, the method includes: receiving a first request from a user device of first user of the plurality at the WLAN, the first request comprising data explicitly identifying the user device and requesting access to a content distribution and delivery network via the wireless local-area network; utilizing the data explicitly identifying the user device to access a network entity to determine a privilege of the user device within the WLAN; obtaining data indicative of the privilege from the network entity; utilizing the data indicative of the privilege to selectively implement at least one WLAN access policy with respect to the user device; and applying a second policy to others of the plurality of users.

In one variant of the method, the WLAN comprises a wireless access point (WAP), the receiving the first request comprises receiving the first request at the WAP, and the method further comprises forwarding at least a portion of the first message to the network entity via a managed content delivery network (CDN) infrastructure. The network entity comprises an entity in data communication with a database of user-specific data both (i) associating the user device with the first user, and (ii) identifying the privilege. The data explicitly identifying the user device comprises for instance a media access control (MAC) address, and the utilizing the data to access a network entity to determine a privilege of the user device within the WLAN comprises accessing the database.

In one implementation, the utilizing the data indicative of the privilege to selectively implement at least one WLAN access policy with respect to the user device comprises: providing the data indicative of the privilege to a controller in data communication with the WAP; and utilizing the provided data within at least one of the WAP and the controller to correlate the privilege with the at least one WLAN access policy.

In another variant, the data explicitly identifying the user device comprises a media access control (MAC) address, and the selectively implementing the at least one WLAN access policy comprises: subsequently identifying a plurality of data associated with the user device of the first user based at least on the MAC address; and handling the identified plurality of data according to the at least one WLAN access policy. The handling the identified plurality of data according to the at least one WLAN access policy comprises for example providing the plurality of data head-of-the-line privilege to available data communications bandwidth of the WLAN. Alternatively, the handling the identified plurality of data according to the at least one WLAN access policy comprises reserving a prescribed portion of available data communications bandwidth of the WLAN for use by the user device.

In another variant, the WLAN comprises a plurality of wireless access points (WAPs), and the method further comprises: determining one of the plurality of WAPs with which the user device has associated; and utilizing the data indicative of the privilege and a location associated with the determined one of the plurality of WAPS to selectively implement the at least one WLAN access policy for the location only.

In a further aspect of the disclosure, a method of providing enhanced wireless local area network (WLAN)-based services to a plurality of users within a prescribed location is disclosed. In one embodiment, the WLAN comprises a plurality of wireless access points, only a portion of which are enabled for provision of the enhanced WLAN-based services, and the method includes: receiving a first request from a user device of first user of the plurality at the WLAN, the first request comprising data explicitly identifying the user device and requesting access to a content distribution and delivery network via the wireless local-area network; utilizing the data identifying the user device to access a network entity to determine a privilege of the user device within the WLAN; obtaining data indicative of the privilege from the network entity; obtaining data relating to a one of the plurality of wireless access points with which the user device is associated; determining that the one wireless access point is enabled for provision of the enhanced WLAN-based services; and utilizing the data indicative of the privilege, and the determination that the one wireless access point is enabled for provision of the enhanced WLAN-based services, to selectively implement at least one WLAN access policy with respect to the user device so as to provide the enhanced WLAN-based services.

In another aspect, a system enabling selectable levels of wireless access for individuals via a WLAN is disclosed. In one embodiment, the system utilizes a plurality of WAPs in a given venue to differentiate services to users (e.g., multiple systems operator or MSO subscribers) based on the user's location within the venue. In one variant, the system utilizes one or more WAP controllers on the back end of the WLAN to implement resource allocation policies as enabled or directed by the MSO's authentication and entitlements infrastructure.

In a further aspect, a method of operating a wireless LAN (WLAN) is disclosed. In one embodiment, the method includes utilizing user device-specific data to differentiate access to enhanced wireless access services so as to obviate higher layer data packet evaluation.

In yet another aspect, a computer-readable apparatus is disclosed. In one embodiment, the computer readable apparatus comprises a storage medium configured to store at least one computer program thereon. In one variant, the computer-readable apparatus is part of a WAP controller in a WLAN-enabled MSO infrastructure. In another variant, the computer-readable apparatus is that of a mobile or end-user device of a user (e.g., subscriber) of the network. In yet another variant, the apparatus is part of a CDN policy or authentication/entitlements server.

In still another aspect, a computer program for use on a mobile device is disclosed. In one embodiment, the computer program comprises an application program (e.g., "app") rendered in a programming language suitable for operation on a mobile or user device operating system (e.g., a Java-based app for use on an Android™ smartphone), and configured to enable the user's device to optimize its operation within a WLAN. In one variant, the WLAN comprises an enhanced-capability WLAN as described above, and is operated by an MSO of a host CDN. The app allows the user device to locate itself (e.g., via GPS receiver of the mobile device) and determine which of a plurality of WAPs within range of the mobile device at that location is appropriate for the user at that location (e.g., a "VIP" (very important person) or press user located in a press box would only want to utilize the enhanced WAP).

These and other aspects shall become apparent when considered in light of the disclosure provided herein.

BRIEF DESCRIPTION OF THE DRAWINGS

FIG. 8 is a block diagram representing an example auditorium configured with the functionality described herein.

FIG. 9 is a block diagram representing an example sports arena configured with the functionality described herein.

Figure 1:
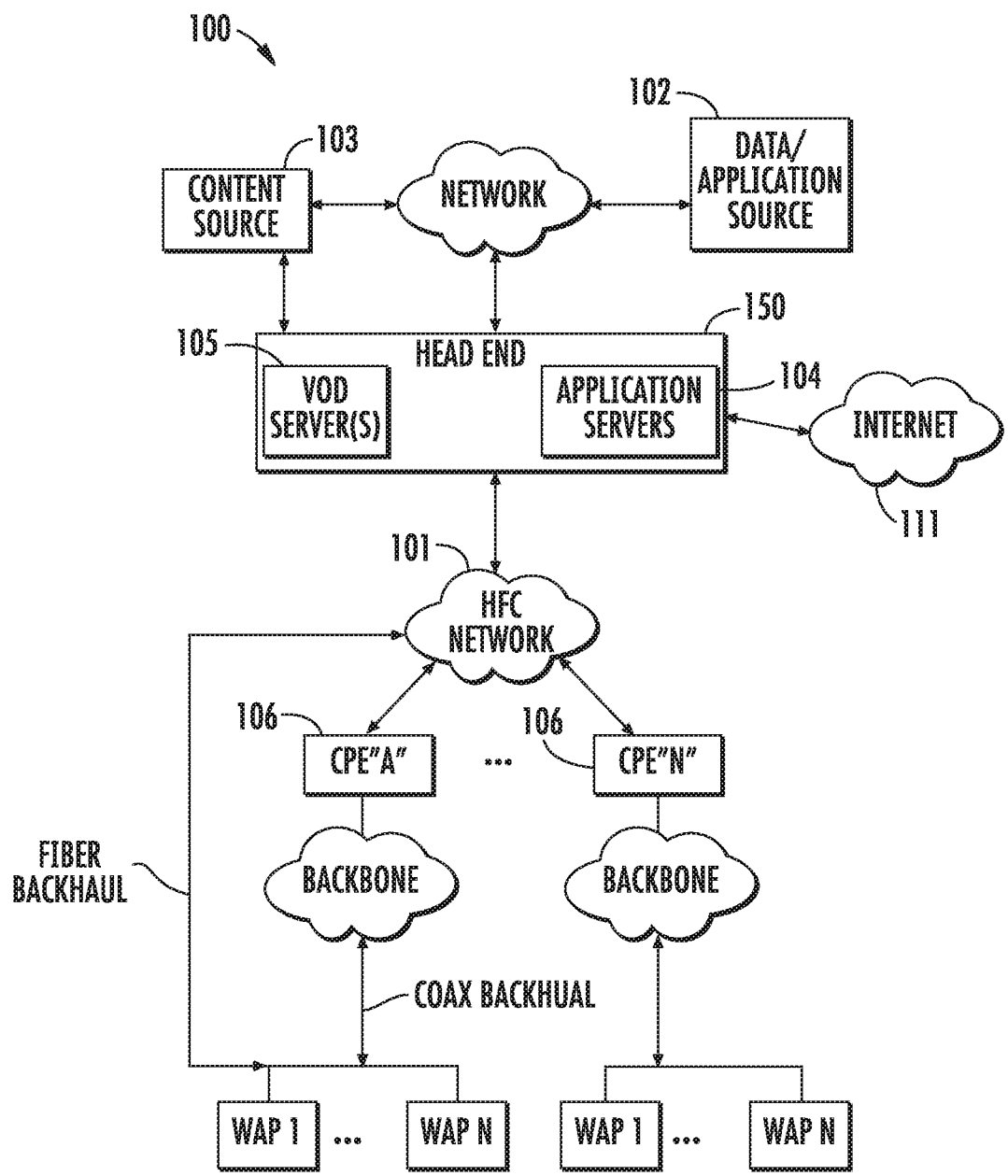
FIG. 1 is a functional block diagram illustrating an exemplary hybrid fiber network configuration useful with various aspects of the present disclosure.

All figures © Copyright 2015 Time Warner Enterprises LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network. As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11 a/b/g/n/s/v/ac or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one aspect, the present disclosure provides a "selectable" data network access system and methods relating thereto. In one exemplary embodiment, the system is intended to reserve or allocate a greater degree of access to a data network, such as for selected users that require and/or request such. Specifically, the exemplary system is configured to provide a greater degree of data network access and/or performance (e.g., a greater uplink/downlink bandwidth, a greater permissible bandwidth consumption, higher priority, better quality/QoS, etc.) to a selected group of users within a location/venue. In one implementation, the foregoing features are provided while also providing a "best effort" data network access (e.g., in some instances a lesser uplink/downlink bandwidth depending on availability of the network, a lesser permissible bandwidth consumption, priority, quality, etc.) to other users; i.e., users other than those in the selected group of users, within the same location/venue after accommodating the higher priority delivery.

Accordingly, in one example scenario, sufficient uplink bandwidth can be selectively provided to members of the media for rapid upload of media content to their respective corporate or third-party servers, while maintaining lower level data network access to other users. In another example scenario, superior wireless service (e.g., faster, better quality, more expansive choices, no advertising, etc.) can be provided to so-called "VIP" users, while maintaining lower-level data network access to other users. In one variant, the user's resource allocation within the wireless access network (e.g., a Wi-Fi WLAN) is determined based on a media access control (MAC) ID or address associated with the user's device, thereby advantageously obviating more detailed or sophisticated analysis required to evaluate the user and his/her needs.

In another variant, the degree and/or "quality" of network access is region- or area-specific, leveraging the ability of the network operator to differentiate location of users based on association of the user's wireless device to a given wireless access point (and hence resolving their range from the access point to within a given region). In one implementation, the user's association with a given WAP is determined by MAC address of the access point hardware.

In addition, security and redundancy schemes may be advantageously deployed consistent with the various aspects disclosed herein.

Methods of operating the foregoing system, including methods of enhancing subscriber satisfaction and conducting business, are also disclosed.

Detailed Description

As referenced above, various aspects of the present disclosure are directed to schemes for providing a solution that, in real time, allocates wireless and network resources to particular users and/or locations.

Specifically, exemplary implementations of the foregoing schemes described herein allow the degree of data network access or functionality to be location-specific. For example, the selected group of users may be located in one or more high priority regions of a venue (e.g., a press box, exhibition floor, VIP area, etc.). The selected group of users in such higher priority regions may be assigned a first user status that is associated with a higher permissible bandwidth consumption or other desired functionality (e.g., low latency and/or high throughput data network access, isochronous data transmission, etc.). Other users may be located in one or more lower-priority regions of the venue. Users in the one or more lower-priority regions may be assigned a second user status that is associated with a lower permissible bandwidth consumption and/or less feature-rich service. Thus, sufficient resources (such as upstream bandwidth) are reserved for the selected group of users, despite network activity of other users.

For example, in some instances, a selected group of the user pool may include one or more members of the press, such as reporters, videographers, and/or other media representatives. It may be desirable to provide the members of the press with a greater degree of network access (e.g., uplink bandwidth) so that they may upload media content (e.g., screenshots, photos, video, written content, etc.) in a timely manner, which is critical to news reporting. In another example, a selected group of the user pool may include one or more VIP guests to whom it is desirable to provide a greater degree of network access, such as foreign dignitaries or their support staff, who require timely access to information (both downlink and uplink).

In yet another example, a selected group of the user pool may include users who pay for a greater degree of network access, or who are subscribers of the MSO or other network operator that is providing the network access.

In even another example, a selected group of users can include users having an end-user device (e.g., audio visual recording equipment, high definition camera, etc.) and/or one or more end user applications (e.g., streaming multimedia applications, file transfer protocol (FTP) applications, etc.) that consume a greater degree of bandwidth. Those of ordinary skill in the related arts will readily appreciate that bandwidth is merely one metric for connectivity; other important requirements for network connectivity may include e.g., latency, throughput, QoS, and/or lossless delivery, etc.

In some variants, the degree of data network access is access pass-specific. For instance, the selected group of users may be those having a higher access pass (e.g., pre-paid or pre-issued access pass) associated with their respective end-user devices based on e.g., a device-specific ID such as MAC. The selected group of users having higher access passes may be assigned a first user status that is associated with a higher permissible bandwidth consumption. The selected group of users (e.g., members of the media, VIP users, etc.) may then be provided with a greater degree of network access (e.g., low latency and/or high throughput data network access, isochronous data transmission, etc.). Other users may have a lower access pass (e.g., free access pass) associated with their respective end-user devices, which may then be assigned a second user status that is associated with a lower permissible bandwidth consumption. Users assigned the second user status may then be provided with a lesser degree of network access (e.g., high latency and/or low throughput data network access, asynchronous data transmission, etc.). Thus, as in the example above, sufficient bandwidth is reserved for the selected group of users, despite network activity of other users.

In additional variants, the system may be configured to automatically switch a user to a different access pass upon expiration of the currently in-use pass. Accordingly, if a user device is accessing the network via a higher access pass and the higher access pass expires, the user device can be automatically switched to a lower access pass (e.g., a free access pass). Conversely, if a user device is accessing the network via lower access pass and the lower access pass expires, the user device can automatically switch to a higher access pass (e.g., a pre-paid access pass).

Additionally or alternatively, further variant systems and methods of the present disclosure may include assigning the first user status (associated with the higher permissible bandwidth access) and the second user status (associated with the lower permissible bandwidth access) based on a classification of the end-user device and/or end user application. For example, a higher bandwidth consumption end-user device (e.g., audio visual equipment, high definition (HD) cameras) may be assigned the first user status, while a lower bandwidth consumption end-user device (e.g., text devices, low resolution devices, etc.) may be assigned the second user status. In another example, a higher bandwidth consumption end user application (e.g., streaming multimedia application, file transfer protocol (FTP) applications, etc.) may be assigned the second user status, while a lower bandwidth consumption end user application (e.g., text applications, social media applications, etc.) may be assigned the second user status.

Other variants of the present disclosure envision additional degrees of permissible bandwidth consumption (e.g., a third user status having a medial permissible bandwidth consumption) for scenarios where it is desirable to have more than two tiers of data network access service. Still other variants of the present disclosure may include shared bandwidth amongst a portion of users (e.g., a selected group of the higher priority users share a fixed bandwidth), in-home embodiments (e.g., selected higher priority users designated within a residential network), and/or opt-in/opt-out services (e.g., a user can opt out of higher priority service).

Accordingly, the foregoing aspects and exemplary embodiments of the apparatus and methods of the present disclosure are now described in detail. While these exemplary embodiments are described in the context of a wireless network (e.g., WLAN) in data communication with a managed hybrid fiber coax (HFC) cable architecture having a multiple systems operator (MSO), the general principles and advantages of the disclosure may be extended to other types of networks and architectures that are configured to deliver digital media data (e.g., text, video, audio, executables, data files and archives, etc.). Such other networks or architectures may be broadband, narrowband, wired or wireless, or otherwise, the following therefore being merely exemplary in nature.

As but one example, the methods and apparatus provided herein could be applied to a so-called "Internet-of-things" or IoT system whereby certain types, functions, or classes of wireless-enabled devices are granted access or privileges or features as compared to other non-privileged devices within, e.g., an intra-premises or inter-premises network such as a PAN or Zigbee network.

It will also be appreciated that while described generally in the context of a network providing service to a customer or consumer (i.e., residential) end user domain, the present disclosure may be readily adapted to other types of environments including, e.g., commercial/enterprise, research and development, and government/military applications. Myriad other applications are possible.

Also, while certain aspects are described primarily in the context of the well-known Internet Protocol (described in, *inter alia, Internet Protocol DARPA Internet Program Protocol Specification*, IETF RCF 791 (September 1981) and Deering, et al., *Internet Protocol, Version 6 (IPv6) Specification*, IETF RFC 2460 (December 1998) each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Service Provider Network

FIG. 1 illustrates a typical service provider network configuration useful with the features of the wireless network described herein. This service provider network 100 is used in one embodiment of the disclosure to provide backbone and Internet access from the service provider's wireless access points (e.g., those in a populated area or venue such as previously described). As opposed to an unmanaged network, the managed service-provider network of FIG. 1 advantageously allows, inter alia, control and management of a given user's access via the wireless access point(s), including imposition and/or reconfiguration of the access "rules" applied to the wireless access points. As but one example, the wireless access points (see discussion of FIG. 2 infra) disposed at the service location (e.g., stadium) can be coupled to the bearer managed network (FIG. 1) via e.g., a cable modem termination system (CMTS) and associated local DOCSIS modem at the venue, a wireless bearer medium (e.g., an 802.16 WiMAX system), a fiber-based system such as FiOS or similar, a third-party medium which the managed network operator has access to (which may include any of the foregoing), or yet other means.

Advantageously, the service provider network 100 also allows components at the service location (e.g., Wi-Fi APs and any supporting infrastructure such as routers, switches, MIMO or modulation coding scheme (MCS) or other physical layer (PHY) configurations, etc.) to be remotely reconfigured by the network MSO, based on e.g., prevailing operational conditions in the network, changes in user population and/or makeup of users at the service location, business models (e.g., to maximize profitability), etc. This is especially true in the exemplary context of subscribers of the managed network which, based on subscription level, tenure, client equipment, or other factors may be included or removed from certain subsets of the potential user population at the venue, given access to different features or privileges, etc. (as compared to say, an unaffiliated generic or opportunistic user who just happens to be at the venue with a Wi-Fi-enabled device).

The various components of the exemplary embodiment of the network 100 include (i) one or more data and application origination points 102; (ii) one or more content sources 103; (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 103, 104, 105, 106 is shown in FIG. 1 for simplicity, although it will be recognized that comparable architectures with multiple origination points, distribution servers, VOD servers, and/or CPE devices (as well as different network topologies) may be utilized consistent with the present disclosure. For example, the headend architecture of FIG. 1a (described in greater detail below), or others, may be used.

Also shown in FIG. 1 are exemplary wireless access points (WAPs), discussed in greater detail below, which are serviced (backhauled) via one or more of a coaxial cable backhaul or an optical fiber backhaul, although yet other approaches may be used consistent with the disclosure (e.g., millimeter wave). For example, the WAPs may be serviced by one or more coaxial drops to the WAP location(s) from e.g., a DOCSIS cable modem (e.g., one of the CPE 106 shown in FIG. 1) and local "backbone". Alternatively, a direct fiber drop (e.g., FTTH or FTTC) may be used as shown. Any number of different configurations will be appreciated by those of ordinary skill in the art given the present disclosure.

Figure 1A:
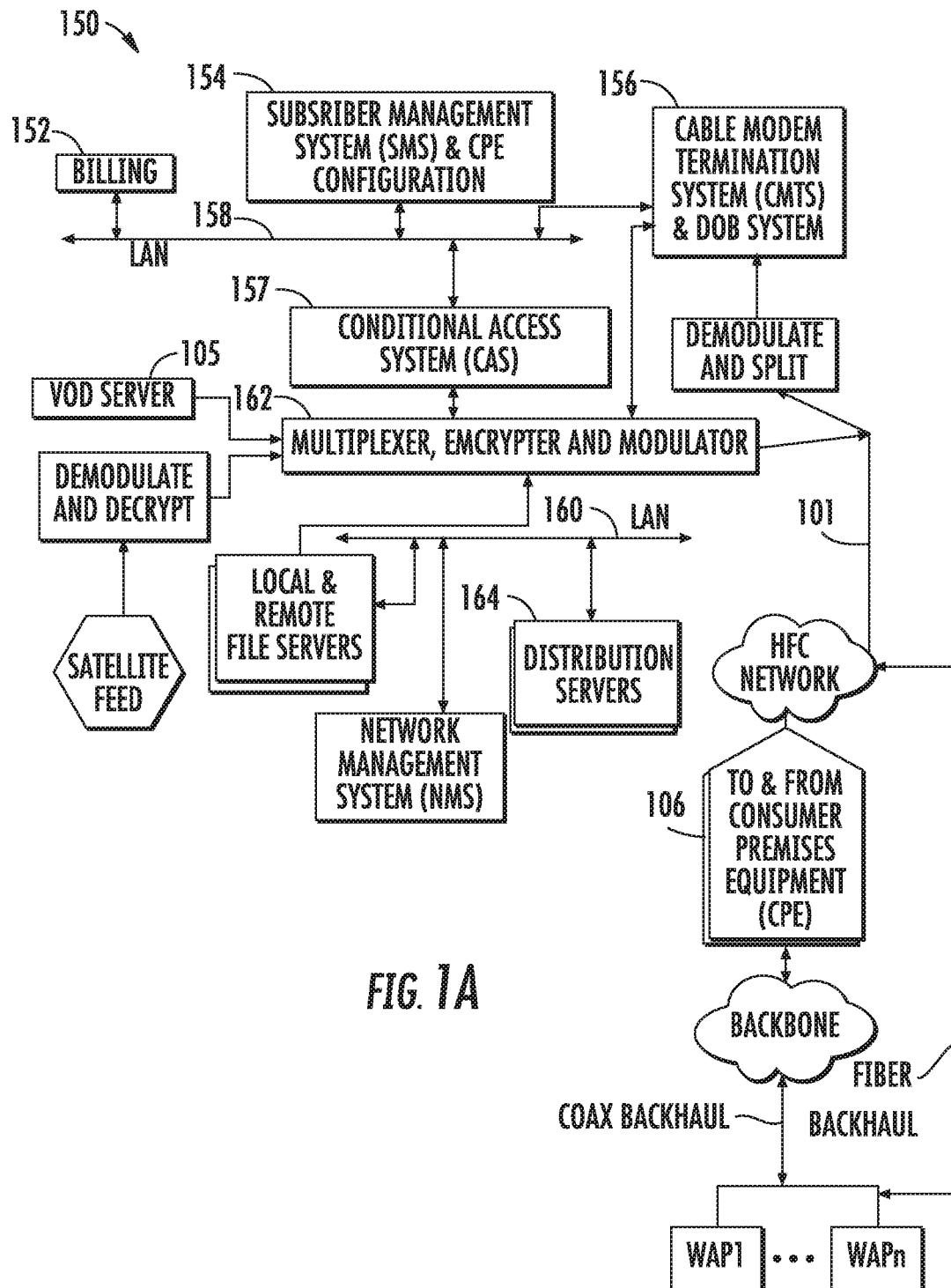
FIG. 1a is a functional block diagram illustrating one exemplary network headend configuration.

FIG. 1a shows one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
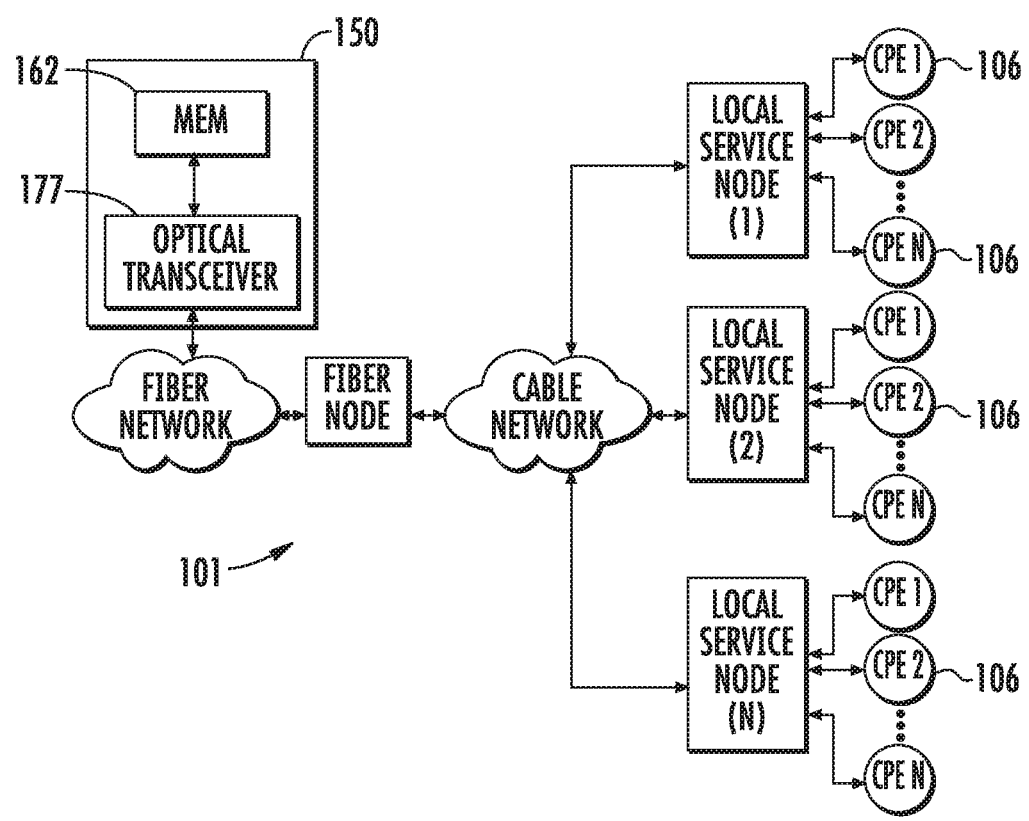
FIG. 1b is a functional block diagram illustrating one exemplary local service node configuration useful with various aspects of the present disclosure.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

Figure 1C:
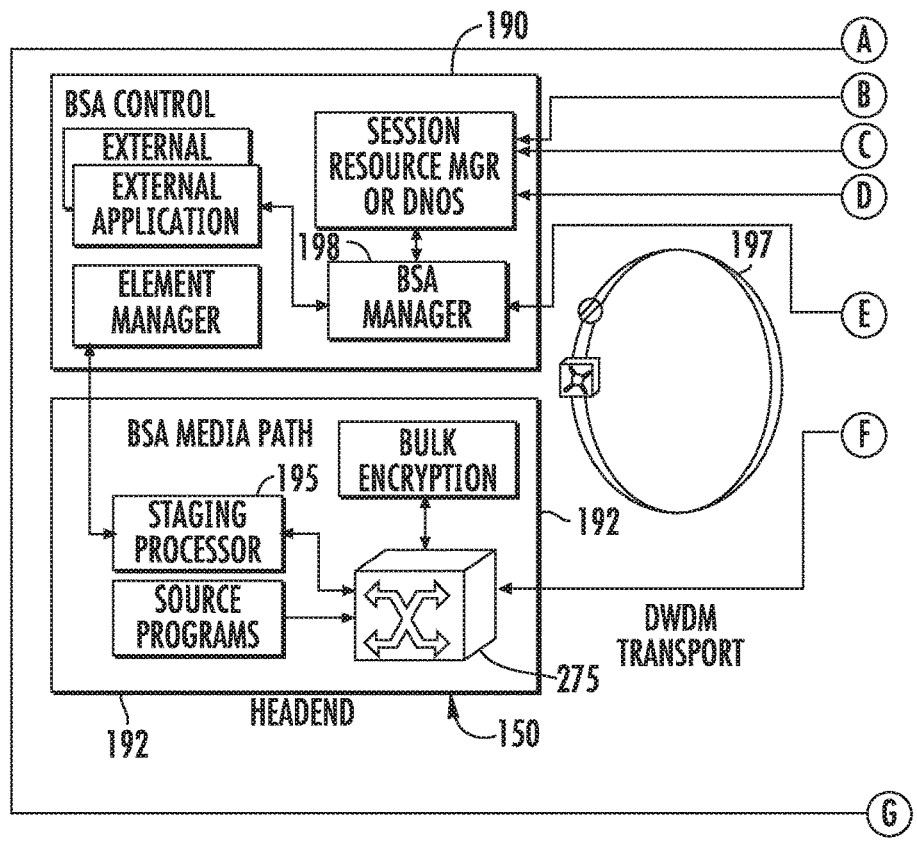
FIG. 1c is a functional block diagram illustrating one exemplary broadcast switched architecture (BSA) network.
Figure 1C:
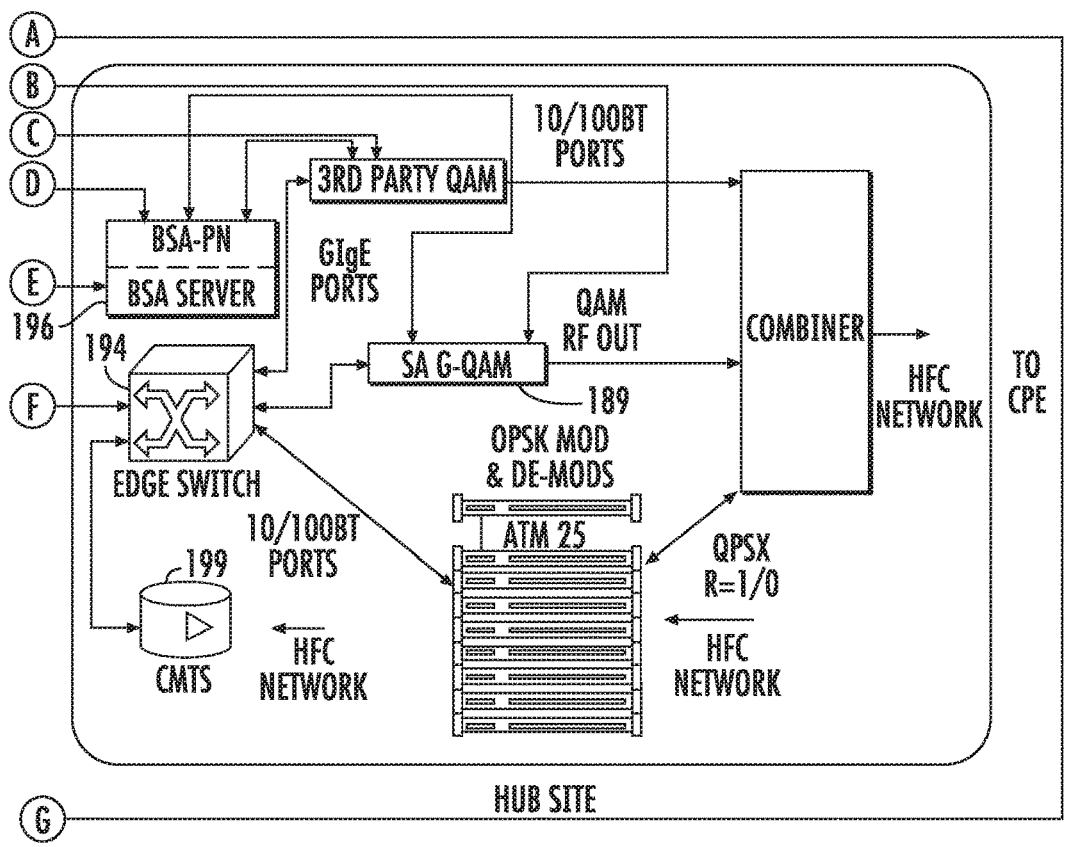

FIG. 1c illustrates an exemplary "switched" network architecture which may be used consistent with the present disclosure for, inter alia, provision of services to the venue(s) of interest. Specifically, the headend 150 contains switched broadcast control 190 and media path functions 192; these element cooperating to control and feed, respectively, downstream or edge switching devices 194 at the hub site which are used to selectively switch broadcast streams to various service groups. BSA (broadcast switched architecture) media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 1D:
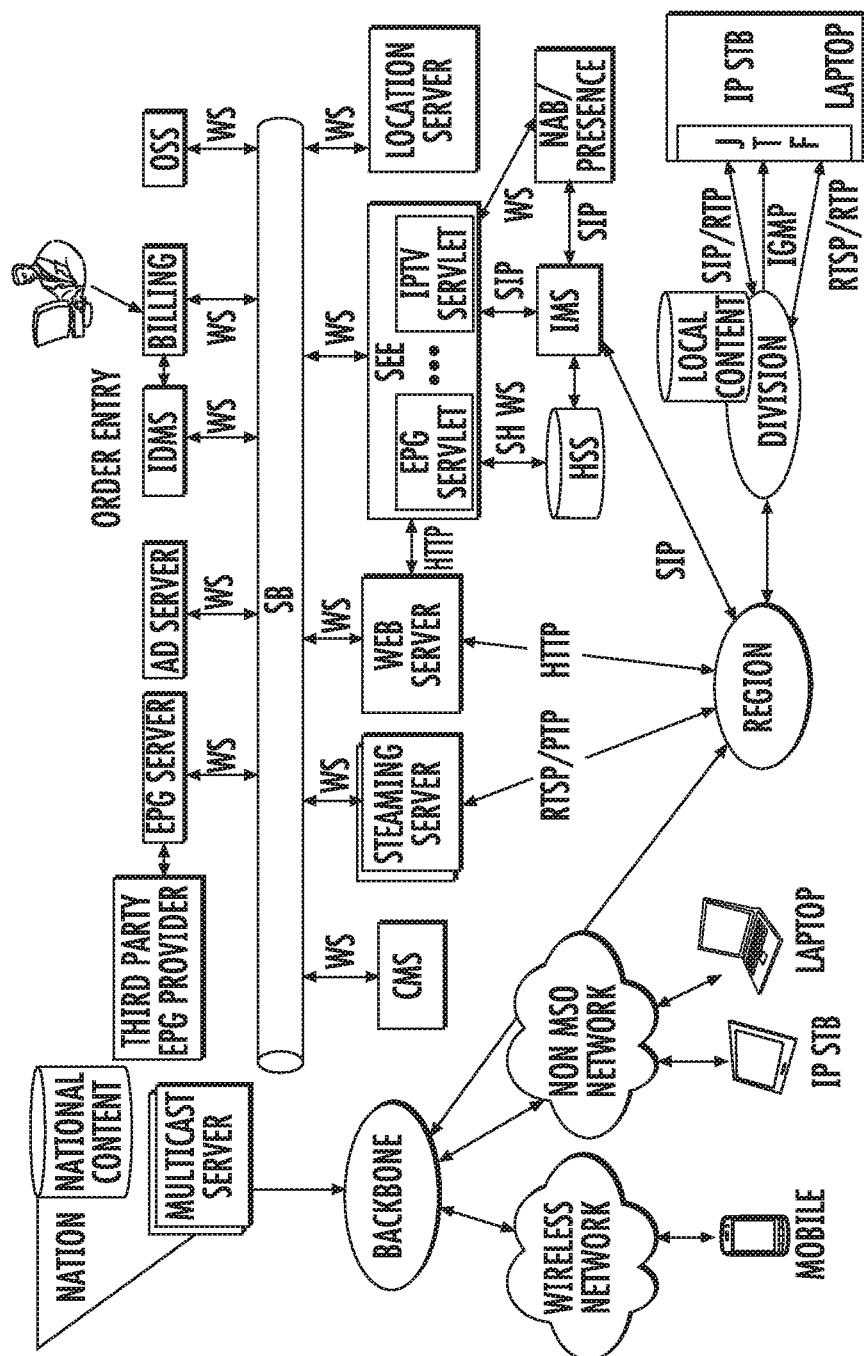
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized"

delivery network is used for carriage of the packetized content (e.g., IPTV content). FIG. 1d illustrates one exemplary implementation of such a network, in the context of a 3GPP IMS (IP Multimedia Subsystem) network with common control plane and service delivery platform (SDP), as described in co-owned U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, now U.S. Pat. No. 10,264,029, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Selectable Data Network Access Architecture

Figure 2:
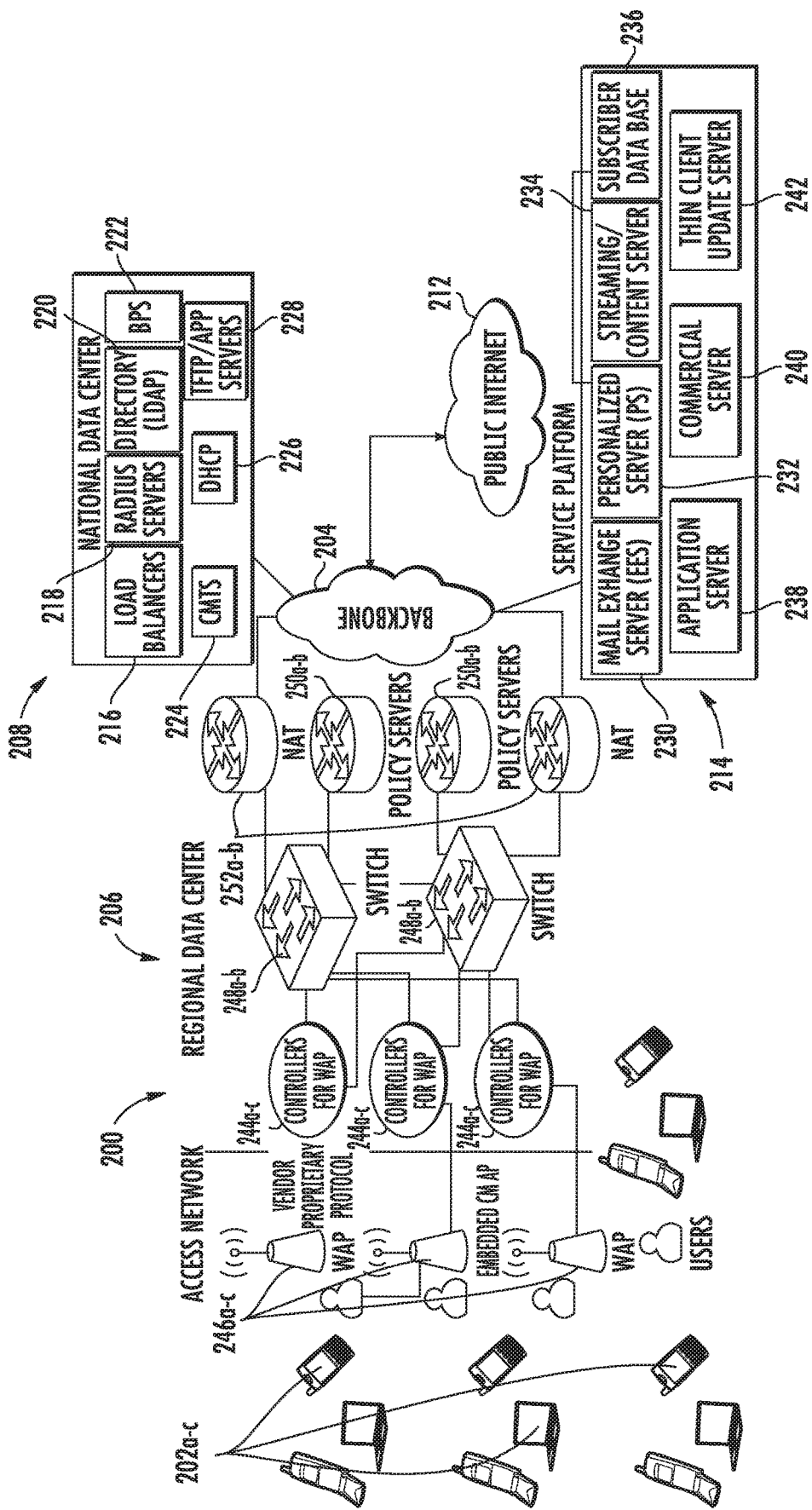
FIG. 2 is a logical block diagram of an exemplary selected degree of data network access architecture useful in conjunction with various principles described herein.

FIG. 2 illustrates a logical block diagram of an exemplary configuration of a selectable data network access architecture 200 consistent with the present disclosure. The architecture 200 of FIG. 2 can be thought of as somewhat of a "logical overlay" of the various hardware and component topologies of FIGS. 1-1d herein, and illustrates and end-to-end abstraction or conceptual architecture to further illustrate the operation of the exemplary system of the disclosure.

Moreover, while the architecture 200 of FIG. 2 is described in the context of an Internet Protocol (IP) network (e.g., one using an IP protocol over a transport control protocol (TCP) transport), it will be recognized that the principles of the disclosure may be extended to other transport modalities and network paradigms.

The architecture of FIG. 2 provides, inter alia, selectable degrees of data network access to a user devices 202 via a connection to a network 204 (e.g., a content delivery network (CDN) such as those of FIGS. 1-1d) through a regional data center 206. In one embodiment of the present disclosure, the network 204 comprises an internet, such as e.g., the Internet. The network 204 may also be in communication with a national data center 208, one or more public internet locations 212, and/or a service platform 214.

In the illustrated embodiment, the national data center 208 includes load balancers 216, remote authentication dial-in user service (RADIUS) servers 218, a lightweight directory access protocol (LDAP) 220, a broadband provisioning system (BPS) 222, a cable modem termination system (CMTS) 224, a dynamic host configuration protocol (DHCP) 226, and a trivial file transfer protocol (TFTP)/application server 228. It will be appreciated that in alternate embodiments, the national data center 208 may include fewer or additional protocols, servers, directories, and/or other components, the configuration of FIG. 2 merely exemplary in this regard.

Further, in the illustrated embodiment, the service platform 214 includes a mail exchange server (EES) 230, a personalized server (PS) 232, a streaming/content server 234, a subscriber database 236, an application server 238, a commercial server 240, and a thin client update server 242. Similarly, in alternate embodiments, the service platform 214 may include fewer or additional servers, data bases, and/or other components.

As shown in FIG. 2, access of end-user devices 202 to the network 204 is regulated and/or controlled by the regional data center 206. The regional data center 206 includes wireless access point (WAP) controllers 244 (244a, 244b, 244c) (i.e., controller apparatus) each in signal communication with one of wireless access points (WAPs) 246 (246a, 246b, 246c). It will be appreciated that the aforementioned signal communication may comprise one or both of "wired" (e.g., copper, optical, etc.) and wireless communication, although in many embodiments, best bandwidth capacity is typically achieved via cable or optical fiber drops to the WAPs. It will be further appreciated that although three WAPs and WAP controllers are shown in FIG. 2, the system architecture can include more or fewer WAPs and/or corresponding WAP controllers (e.g., two, five, six, etc.). Further, in other examples, a single WAP controller can be configured to control/regulate more than one WAP in the system architecture, or conversely, multiple controllers can be utilized to control a single or lesser number of WAPs (such as e.g., where logical control functions or processes affecting a single WAP are distributed across two or more controllers, for purposes of redundancy, etc.); hence, the illustrated architecture 200 of FIG. 2 is merely logical (conceptual) for purposes of illustration, and does not necessarily represent actual component configurations in an implementation.

The WAPs 246 are in the exemplary embodiment devices that allow the end-user devices 202 to connect to a wired or other network, such as the network 204 shown, using wireless technology (e.g., Wi-Fi or other limited-range wireless multi-user access technology). In some examples, the WAPs are each configured to provide a wireless local area network (WLAN) accessible to user devices within a physical range of the WAP, transmit a beacon frame to announce the presence of the wireless LAN (for use by the wireless-enabled end-user devices within range), and receive probe requests from these end-user devices in order to establish communications between a given WAP and end-user device(s). The range of the WAP can vary depending on placement, obstructions, type of antenna, weather, operating frequency, etc., but is typically limited to a range within approximately a 100 ft. radius of the WAP. Accordingly, end-user devices that are within range of the WAP can access the network via the corresponding provided WLAN, while end-user devices outside of the range of the WAP are unable to access the associated WLAN, and thus are unable to access the network. Thus, in the example depicted in FIG. 2, the end-user devices 202a are within range of the WAP 246a, the end-user devices 202b are within range of the WAP 246b, and the end-user devices 202c are within range of the WAP 246c. It is appreciated that there is typically at least some overlap between the WAPs in terms of coverage, such that a given user device can associate with one of a plurality of possible WAPs at a given location.

As stated above, each of the WAP controllers 244 is in signal communication with at least one of the WAPs 246. Additionally, as indicated in FIG. 2, each of the WAP controllers 244 is in further signal communication with one or more switches 248, policy servers 250 (250a, 250b), and network address translation (NAT) routers 252 (252a, 252b), which allow access to the network 204. In other words, a second interface of each of the WAP controllers 244 is in signal communication with the network 204 (e.g., a CDN).

In the illustrated implementation, the WAP controllers 244 are each in direct communication with both of the switches 248 (248a, 248b) so as to permit, inter alia, cross-connect between them if desired. The switches 248 are network switches configured to connect the various wireless LANs (i.e., wireless LANs generated by WAPs 246 and WAP controllers 244) into a combined wired LAN (i.e., a larger LAN), such as for example for serving a specific location/venue, and allow communication between the WAP controllers 244 and the policy servers 250 and the NAT routers 252.

The above described components located within the regional data center 206 (e.g., WAPs 246, WAP controllers 244, NATs 252, policy servers 250, etc.) are in the illustrated embodiment in communication with one or more authentication, authorization, and accounting (AAA) servers (not shown) at the national data center 208 (e.g., a subsection of the RADIUS servers). The AAA servers are configured to provide, inter alia, authorization services and facilitate tracking and/or control of files at the TCP/IP level. In general, the AAA servers accept access control requests, process the requests against a formal set of statements that define allocation of the network 204 resources, and return access control responses. Network resources can be allocated based on client authorization privileges (or so-called "entitlements", such as via an entitlement management message (EMM); see also e.g., the exemplary methods and apparatus described in co-owned U.S. patent application Ser. No. 12/536,724, filed on Aug. 6, 2009 and entitled "System And Method For Managing Entitlements To Data Over A Network", now U.S. Pat. No. 8,341,242, which is incorporated herein by reference in its entirety, which may be used consistent with the present disclosure for such functions), availability of network resources, and/or any other factors the network manager may specify when composing the policy. Further, authentication, authorization, and accounting provide a framework for intelligently controlling access to computer resources, enforcing policies, auditing usage, and providing the information necessary to bill for services.

Authentication processes in the illustrated implementation are configured to identify a user, typically by having the user enter a valid user name and valid password before access is granted. The process of authentication may be based on each user having a unique set of criteria or credentials (e.g., unique user name and password, challenge questions, entry of biometric data, entry of "human" verification data such as "Captcha" data, etc.) for gaining access to the network 204 at the TCIP/IP level. Specifically, the AAA servers may compare a user's authentication credentials with user credentials stored in a database. If the authentication credentials match the stored credentials, the user may then be granted access to the network 204. If the credentials are at variance, authentication fails and network access may be denied.

Following authentication, the AAA servers are configured to grant a user authorization for certain features, functions, and/or doing certain tasks. After logging into a system, for instance, the user may try to issue commands. The authorization process determines whether the user has the authority to issue such commands. Simply put, authorization is the process of enforcing policies: determining what types or qualities of activities, resources, or services a user is permitted. Usually, authorization occurs within the context of authentication. Once a user is authenticated, they may be authorized for different types of access or activity. A given user may also have different types, sets, or levels of authorization, depending on any number of aspects. For instance, a given "press" user (described subsequently herein) may only have press-related credentials (and hence access to one or more of the enhanced features described herein) within certain time windows or in certain circumstances, such as when the user is attending an event at a venue in their official capacity as a Press representative. In one variant, the AAA (or other entity) receives data from a third-party server or proxy relating to authorizations to be granted to an individual at certain times/event (e.g., "John Smith is authorized for Press access at Concert A on date xx-yy-zzzz, but not Concert B on date aa-bb-cccc" or the like).

The AAA servers may be further configured for accounting, which measures the resources a user consumes during access. This may include the amount of system time or the amount of data a user has sent and/or received during a session, somewhat akin to cellular data plans based on so many consumed or available Gb of data. Accounting may be carried out by logging of session statistics and usage information, and is used for, inter alia, authorization control, billing, trend analysis, resource utilization, and capacity planning activities. It will be appreciated that in other examples, one or more AAA servers can be located at the regional data center, and may be linked to a third-party or proxy server, such as that of an event management entity.

After a user is granted access to the network 204 via the AAA servers, a unique ID of the user device (e.g., a MAC address) is provided to the policy servers 250 in communication with the WAP controllers 244. The policy servers 250 (i.e. WAP policy servers) are, in the exemplary implementation, substantially security components within regional data center 206 (i.e., local policy servers) for regulating access to the wired LAN and enforcing selectable degree of data network access policies for the WAP controllers. Specifically, policy servers 250 are configured to, in combination with WAP controllers 244, implement the "selectable" degree of data network access protocols (such as by implementing the method 600 shown in FIG. 6). In general, the policy servers accept access control requests at the local level (e.g., media access control (MAC) layer), process the requests against a formal set of statements or rules that define allocation of the wired LAN's resources, and return access control responses. The wired LAN resources are allocated via the policy servers 250 based on, in one variant, an assigned user status associated with the end-user device identifying information (e.g., MAC address). As described elsewhere herein, user status may be assigned based on any one or more of a variety of different considerations or parameters, such as (i) location within a venue of the user device, (ii) a class of end-user device, (iii) a class of end user application, and/or (iv) an access pass associated with the user device.

The NAT routers 252 are configured to connect the wired LAN of the location/venue to external networks, such as the network 204, and are in direct communication with the external network. Though not specifically shown, each of the NAT routers 252 may each include a processing apparatus, memory, and/or a storage apparatus with computerized logic such as e.g., computer programs, which may include NAT tables to perform translation/switching capabilities between a source (e.g., one or end the end-user devices 202) and another device.

The NAT routers 252 may for example map multiple private IP addresses (e.g., IP addresses for each of WAPs 246 provided by a DHCP server residing in a CMTS environment such as that of FIG. 1c, IP addresses for each of end-user devices 202, etc.) to one or more publicly exposed IP addresses assigned by an Internet service provider. As is known, network address translation (NAT) is a scheme of mapping for instance an IP address space into another by modifying network address information in IP packet headers while in transit across a traffic routing device. Destination NAT (DNAT) is a technique for transparently changing the destination IP address of an end route packet and performing the inverse function for any replies. Source NAT (SNAT) is a technique for transparently changing the source IP address of a packet and performing the inverse function for any replies.

In one exemplary implementation of the present disclosure, as data passes from the LAN to the external network (i.e., network 204), the source address in each data packet may be translated from a private address to the public address via the NAT routers. Further, the NAT routers may track basic data about each active connection (particularly the destination address and port). When a reply returns to the NAT routers, they may use the connection tracking data stored during the outbound phase to determine the private address on the internal network to which to forward the reply. Furthermore, the NAT routers 252 may be configured to establish Transmission Control Protocol (TCP)/IP connections. These connections may utilize, e.g., Real Time Protocol (RTP) or Real Time Streaming Protocol (RTSP) via User Datagram Protocol (UDP).

Exemplary WAP Controller and WAP Policy Server

Figure 3:
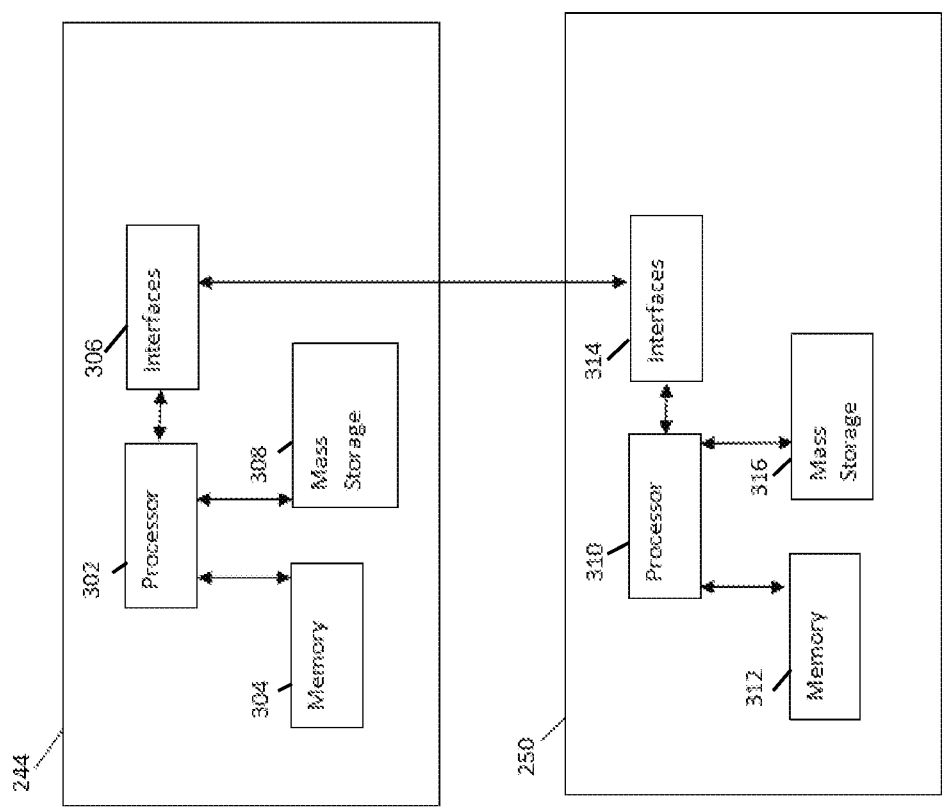
FIG. 3 is a functional block diagram illustrating an exemplary wireless access point (WAP) controller useful in conjunction with various principles described herein.

Referring now to FIG. 3, a functional block diagram illustrating an exemplary wireless access point (WAP) controller (one of the WAP controllers 244) and an exemplary policy server (one of policy servers 250) is disclosed. The WAP controller 244 comprises a processing apparatus 302 (i.e., a processor), memory 304 (i.e., a storage apparatus), and is in communication with the network backbone 204 (i.e., part of the MSO content delivery network (CDN)), switches 248, policy servers 250, the NAT routers 252, wireless access points (WAPs) 246, and/or the end-user device 202 via (network) interfaces 306. Specifically, the interfaces 306 can include a first interface in signal communication with a wireless network (e.g., the WAPs 246) and a second interface in signal communication with the backbone of the content delivery network (CDN) 204. These interfaces might comprise for instance GbE (Gigabit Ethernet) or other interfaces of suitable bandwidth capability to support the operation of the WLAN (customer side) and wireline LAN. In one variant, the WAPs include a coaxial cable interface and modem capable of communicating with the WAP controllers via coaxial cable drops to the premises/ venue, akin to extant customer installations for the HFC-based networks of FIGS. 1-1*d*. For instance, in one implementation utilized by the Assignee hereof, all traffic (including data, control, management) are sent to the MSO backbone, which utilizes a plurality of "drops" (e.g., coax cable) which are serviced by the HFC network and CMTS (FIGS. 1-1*c* herein) to one or more wireless core networks in regional data centers (RDCs) where the WAP Controllers are located.

The processing apparatus 302 is configured to execute at least one computer program stored in memory 304 (e.g., non-transitory computer readable storage media). The computer program may include a plurality of computer readable instructions for operating the WAP controller 244, such as e.g., using the method shown in FIG. 5 (described in detail elsewhere herein). The memory 304 may additionally locally store other data (e.g., user status, permissible bandwidth consumption, etc.), or such data may be stored remotely within the MSO's managed network (or at a third-party service provider used to maintain/analyze such data).

As shown in FIG. 3, the WAP controller 244 is in data communication with one or more policy servers 250, which enforce(s) or implements the desired "selectable" data network access policies for the wireless local area network (LAN) provided by WAPs 246. It will be appreciated that in other configurations contemplated by the present disclosure, the policy server may be made physically integral to the WAP controller, and/or one or more of its logical processes may be integrated therewith (such as using a common application or other computer program or resource to perform the various desired controller and policy functions). In this fashion, certain policy functions may be delegated to entities closer to the service location (e.g., venue), which may provide access to data which has not yet (or cannot) propagate further upstream into the MSO network.

In one embodiment, the policy server 250 comprises a processing apparatus 310 (i.e., a processor), memory 312 (i.e., a storage apparatus), and is in communication with the backbone of the CDN 204, switches 248, policy servers 250, the NAT routers 252, wireless access points (WAPs) 246, and/or the end-user device 202, via one or more interfaces 314.

In one embodiment, the processing apparatus 310 of the policy server is configured to execute at least one computer program stored in memory 312 (e.g., non-transitory computer readable storage media). The computer program may e.g., implement the exemplary methods for operating the WAP controller 244 and/or the policy server 250 as shown in FIGS. 4-6 (described in detail elsewhere herein).

Figure 4:
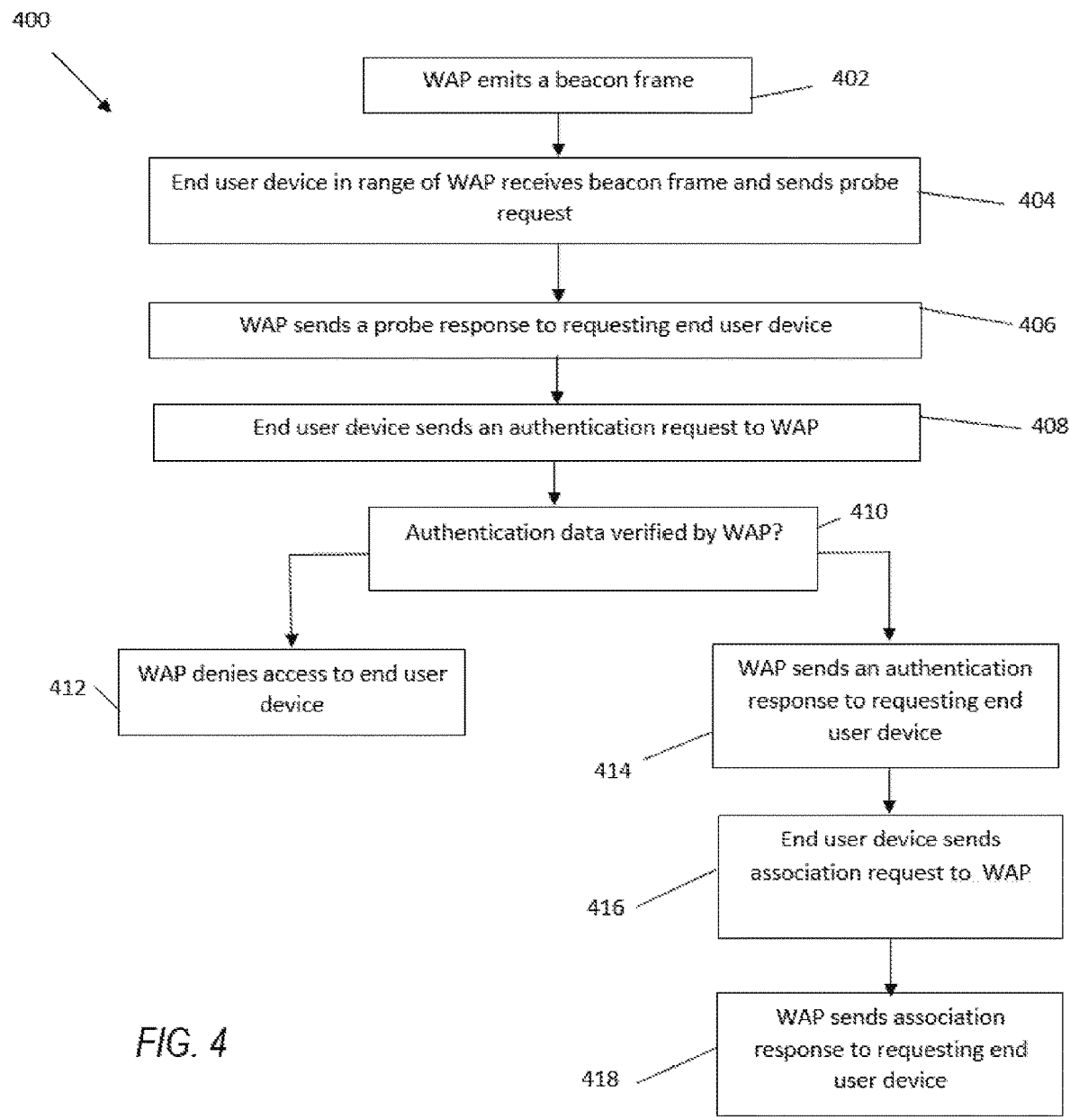
FIG. 4 is a logical flow diagram representing one embodiment of a method for establishing a connection between an end-user device and a WAP.
Figure 5:
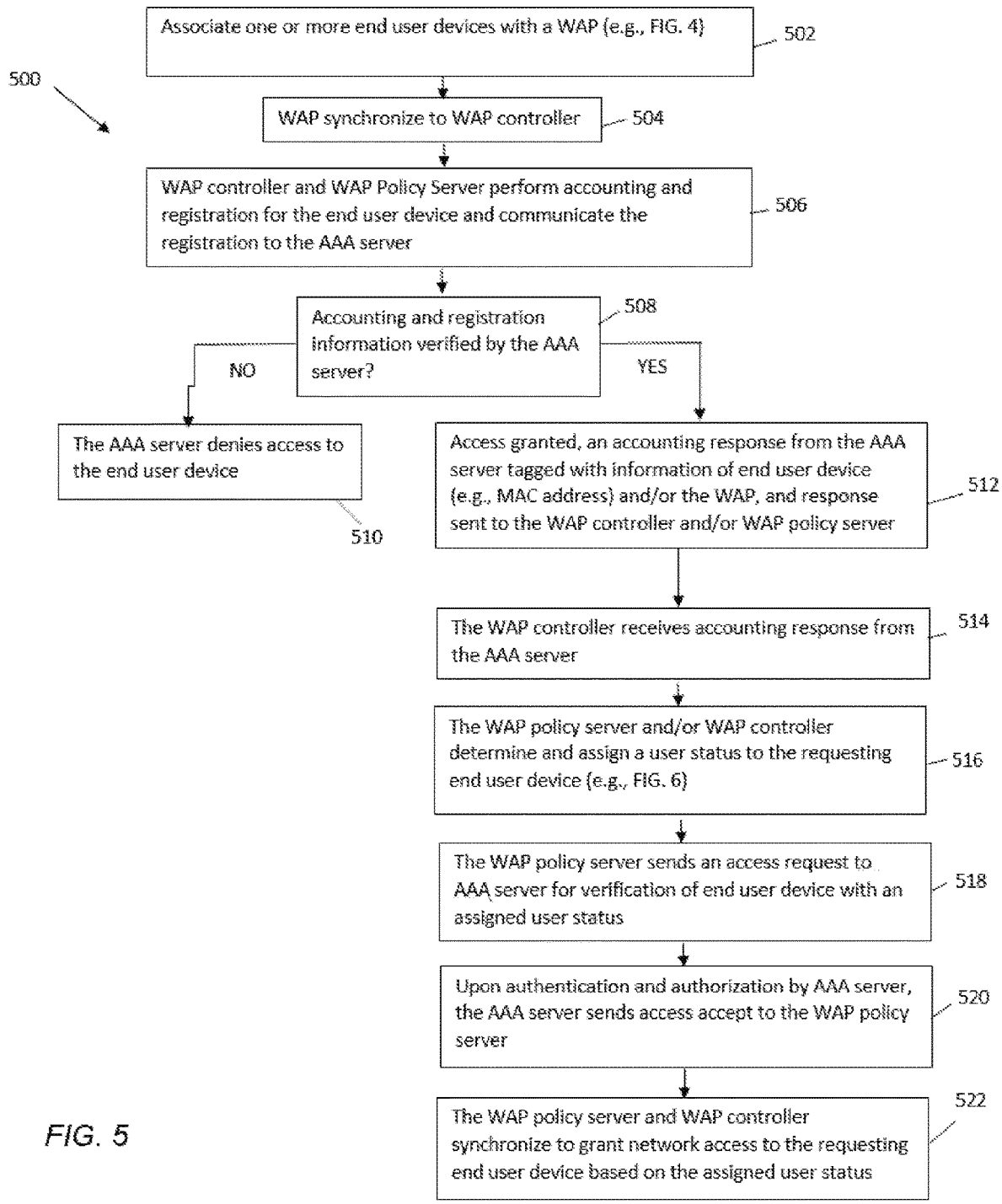
FIG. 5 is a logical flow diagram representing one embodiment of a method for operating a system used for controlling selectable degrees of data network access according to the present disclosure.
Figure 6:
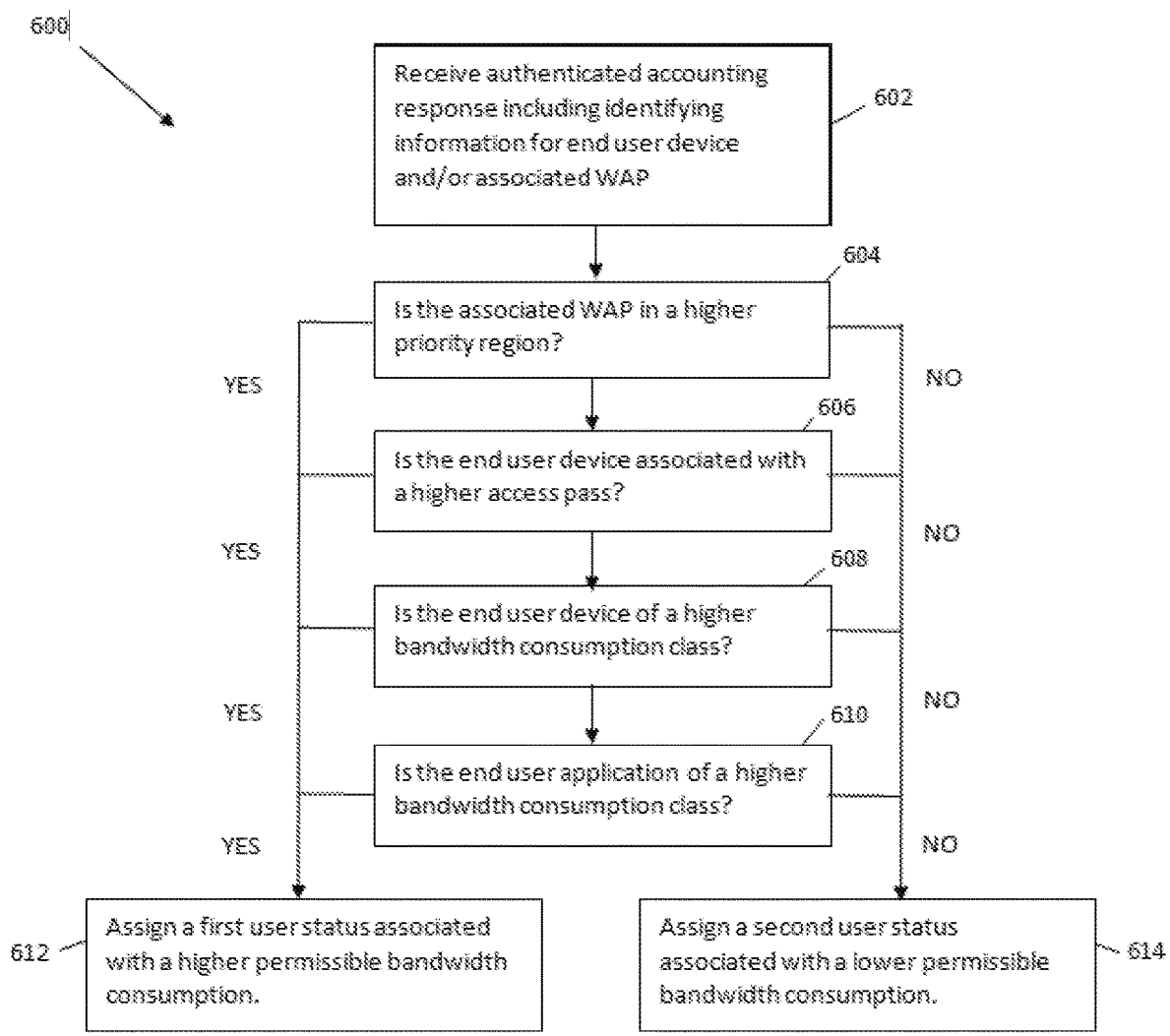
FIG. 6 is a logical flow diagram representing one embodiment of a method for operating a WAP controller used for controlling selectable degrees of data network access according to the present disclosure.

The operation of the WAP controller(s) 244 and the policy server(s) 250 are described elsewhere herein, such as, inter alia, in reference to methods 400, 500, and 600 shown in FIGS. 4-6, respectively.

Methods

Referring now to FIGS. 4 and 5, exemplary embodiments of methods for operating the various components of the regional data center 206, including the wireless access point (WAP) controllers 244 and the policy servers 250, and for associating an end-user device with a WAP, are described.

One exemplary method 400 for associating an end-user device with a WAP is shown in FIG. 4 herein. First, at step 402, the WAP emits a beacon frame, which is a periodically emitted signal announcing the presence of the WAP within the wireless local access network (LAN).

At step 404, an end-user device receives and/or detects the beacon frame, and in turn sends a probe request to the WAP, requesting information from the specific access point. In response to receipt of the probe request, at step 406, the WAP sends a probe response to the requesting end-user device. The end-user device then sends an authentication request to the WAP at step 408, and the authentication data (e.g., a local WAP password such as a guest password) from the user device is verified by the WAP at step 410.

In response to receipt of an unacceptable authentication request, at step 412, the WAP denies access to the wireless LAN for end-user device. Alternatively, if the WAP receives an acceptable authentication request, at step 414, the WAP sends an approved authentication response to the requesting end-user device.

At step 416, the end-user device then sends an association response to the WAP. In response to receipt of the association request, at step 418, the WAP sends an association response to the requesting end-user device in order to complete association of the end-user device and the WAP.

It will be appreciated that method 400 is just one example method for association of an end-user device and a WAP, and other methods having fewer or additional steps can alternatively be included.

Moreover, different types of authentication or "credentialing" can be utilized consistent with the methodology of FIG. 4. For example, in one variant, the user's credentials are generally ubiquitous or consistent with their access across the MSO's entire network, such as where the user's ID or username can be used to access various heterogeneous functions with the MSO's network, such as content on-demand, DOCSIS modem Internet access at their premises, etc. Alternatively, the WLAN user credentials can be made specific to the WLAN function, or even subsets of the WLAN access function (e.g., separate credentials for the user's "VIP Press Pass" function versus other functions).

It will also be recognized that access to one or more functions can be gated or conditional on various information. For example, in one implementation, a user attempting to associate with a given WAP will be first challenged to provide credentials to authenticate to the AAA server (e.g., user ID, password, biometric data such as a thumb print on a smartphone capacitive touch screen, facial recognition, etc.). Once the identity of the user is verified, for example as being a valid MSO subscriber, the MAC address or other data indicative of the particular user device is passed upstream as described elsewhere herein in order to verify that the particular user device is in fact associated with the user, and in fact is authorized for the enhanced policy implementation by the WAP/WAP controller.

In another implementation, the MAC address is utilized by itself to authenticate the user; i.e., the presumption being that the user is in fact in possession of their own device, and the unique device MAC address (presumably registered in the MSO authentication database) need only be validated as being associated with an MSO subscriber who has enhanced policy privileges.

In another implementation, the MAC address and information about the associated WAP are used by the MSO to authenticate the user (e.g., as an MSO subscriber validate) and to validate their access to the enhanced wireless access policy at the particular WAP—this is in contrast to a "blanket" authorization as described elsewhere herein (i.e., authentication as an MSO customer with privilege enables immediate access to the enhanced wireless services, wherever they may be offered). For instance, the MSO AAA server may be consulted for (i) the authentication, (ii) to verify that the MAC address of the user's device is registered with the user (MSO subscriber), and (iii) that the MAC address or location data associated with the WAP which the user device is attempting to access is in fact authorized for that user (e.g., a particular press member is authorized by U.S. Secret Service for entry into the Press Box at a Presidential debate, and attendant access to a WAP covering that Press Box).

In yet another implementation, the MAC address can be used by itself in authenticating to a third party authentication server (whether directly or via the MSO CDN). For instance, at the aforementioned Presidential debate, press members may need to be cleared by U.S. Secret Service, including their media or personal electronic devices being validated/identified by the MAC address in a database maintained by the Secret Service. Hence, when the user associates with a WAP in the "Press Box", the MAC address is used by the WAP/WAP controller to access the Secret Service database to verify that the particular device is authorized in that area. The MSO database may also be used in tandem to verify that the user has privilege for the enhanced wireless access policies provided by the WAP in the Press Box, separate from the user's right to be in the Press Box.

Referring now to FIG. 5, one exemplary embodiment of a method for operation is shown. At step 502 of the method 500, one or more of the end-user devices 202 is associated with one of the WAPs. This might occur, depending on application layer software configuration within the end-user device (e.g., tablet, smartphone, etc.), either automatically, such as where the user device signs into the WAP using its credentials (e.g., user ID, password, etc.) based on a given selection criterion such as strongest RSSI, first WAP encountered, according to a predetermined hierarchy or list, or yet other approaches. Alternatively, the association may be made manually, such as via the application layer software of the user device (e.g., a "settings" or similar menu, wherein a listing of available WAPs and their associated name, signal strength, network data, etc. are shown). As noted previously, in the exemplary instance of Wi-Fi, the WAPs will periodically issue beacons to advertise their presence to the end-user devices which may be in wireless range of the WAP's physical layer (e.g., 2.4/5.0 GHz radio waves). These beacons will enable the user device to obtain and display various information relating to the WAP (e.g., name such as "Time Warner Cable Wireless Access Point", RSSI, network address, etc.) as previously noted.

After association of the end-user device and the WAP is established, at step 504 the WAP is then synchronized and in communication with the WAP controller, this being accomplished using well known techniques such as those specified in the Wi-Fi Standards.

Next, at step 506, the WAP controller and WAP policy server perform accounting and registration for the requesting end-user device (e.g., the user's smartphone, tablet, Wi-Fi enabled camera, media device, etc.), and communicate the registration to the AAA server. Accounting and registration information communicated to the AAA server may include for example an authentication of the service provider and/or user account. The AAA server may perform any of the previously described authentication, authorization, and/or accounting procedures in order to verify access to the network for the requesting end-user device at step 508.

In response to receipt of unacceptable accounting and registration information, at step 510, the AAA server denies access to the wired LAN for the end-user device. Alternatively, in response to receipt of acceptable accounting and registration information, at step 512, the AAA server grants access for the end-user device and an accounting response such as a message rendered according to a given communications protocol (e.g., a lightweight communications protocol implemented specifically for this purpose, or alternatively a generalized messaging protocol) from the AAA server is tagged with identifying information (e.g., media access control (MAC) address) for the end-user device and/or the associated WAP. At step 514, the WAP controller receives the accounting response from the AAA server.

In response to verification by the AAA server and receipt of the accounting response message, the WAP policy server and/or the WAP controller determines and assigns a "user status" to the requesting end-user device, and associates the assigned user status with the unique identifier of the end-user device (e.g., "MAC" address such as MAC-48, EUI-48, EUI-64, or other format) at step 516. It will be appreciated that the term "user status" as used in the present context is intended broadly, and may include any number of different implementations which communicate information to entities elsewhere in the network (e.g., the WAPs/WAP controllers at the network edge) indicative of or useful in provisioning and providing the desired services or functions to the requesting end-user device(s). For example, in one such implementation, one or more data elements or codes are used to indicate to the recipient network entity (e.g., WAP/controller), based on entry into a locally-maintained lookup table of policies, which policy or policies to apply to communications or service requests of the particular end-user device (based on MAC). As a simple illustration, a given code or data value may be indicative of a "VIP Press" user (i.e., the end-user device thereof), which should be granted "head-of-the-line" on bandwidth requests, additional bandwidth under an extant bandwidth allocation scheme, implementation of a asymmetric bandwidth policy (e.g., same downstream, but enhanced upstream), certain QoS rules, and so forth.

As described elsewhere herein, such status may also be associated with or indicative of a location of the requesting user device, such as in the "press box" at a given event, such that the user, by virtue of their location, is granted additional or enhanced functionality or privileges.

In another approach, the WAP/controller may utilize the received "user status" (e.g., code or data structure) to access one of the policy servers (FIG. 2) or a proxy thereof to obtain a current policy definition for the user device.

The access request of FIG. 5 may include a request for access based on a user status associated with a specific permissible bandwidth consumption for the end-user device. The WAP controller, in communication with the WAP policy server, may assign a user status associated with a permissible bandwidth consumption to an end-user device, such as by using the example method 600 shown in FIG. 6.

As shown in FIG. 6, the WAP controller/policy server receive the authenticated accounting response including identifying information (e.g., MAC address) for the end-user device and/or the associated WAP (step 602). At step 604, the WAP controller/policy server determine a location of the end-user device identifying information within the location/venue. Specifically, the WAP controller/policy server determine if the WAP associated with the end-user device is located in a higher priority region, rather than being in a lower priority region. Further, at step 606 the WAP controller/policy server detect an access pass associated with the end-user device identifying information. Specifically, the WAP controller/policy server determines if the end-user device includes a higher access pass (e.g., a pre-paid access), rather than a lower access pass (e.g., a free access pass). Furthermore, at step 608, the WAP controller/policy server detect a classification of the end-user device associated with the end-user device identifying information. Specifically, the WAP controller/policy server determine if the end-user device is of a higher bandwidth consumption device class, rather than a lower bandwidth consumption device class. Further still, at step 610, the WAP controller/policy server detect a classification of the end user application. Specifically, the WAP controller/policy server determine if the end user application is of a higher bandwidth consumption class, rather than a lower bandwidth consumption class.

If one or more of the decisions made at steps 604-610 is true (i.e., YES), then the WAP controller/policy server may assign a first user status granting and/or being associated with a higher permissible bandwidth consumption to the end-user device identifying information at step 612. Alternatively, if one or more of the decisions made at steps 604-610 is false (i.e., NO), then the WAP controller/policy server may assign a second user status granting and/or being associated with a lower permissible bandwidth consumption to the end-user device identifying information at step 614. It will be appreciated that steps 604-610 are substantially a formal set of statements that define allocation of the LAN's resources. It will be further appreciated that in alternate embodiments the set of formal statements can include more or fewer control statements and/or the control statements can be alternately employed as instructed by a network administrator. It will be still further appreciated that in alternate embodiments the formal statements can include additional user status assignments for varying degrees of permissible bandwidth consumption (e.g., a third user status associated with a medial permissible bandwidth consumption, etc.).

Returning again to FIG. 5, at step 518, the WAP policy server and/or the WAP controller sends an access request to the AAA server including the user status assigned to the requesting end-user device. At step 520, the AAA server then an access accept notification to the WAP policy server verifying the user and/or WAP profiles. Finally, at step 522, the WAP policy server and the WAP controller synchronize in order to grant network access to the requesting end-user device based on the assigned user status and associated permissible bandwidth consumption.

Figure 7:
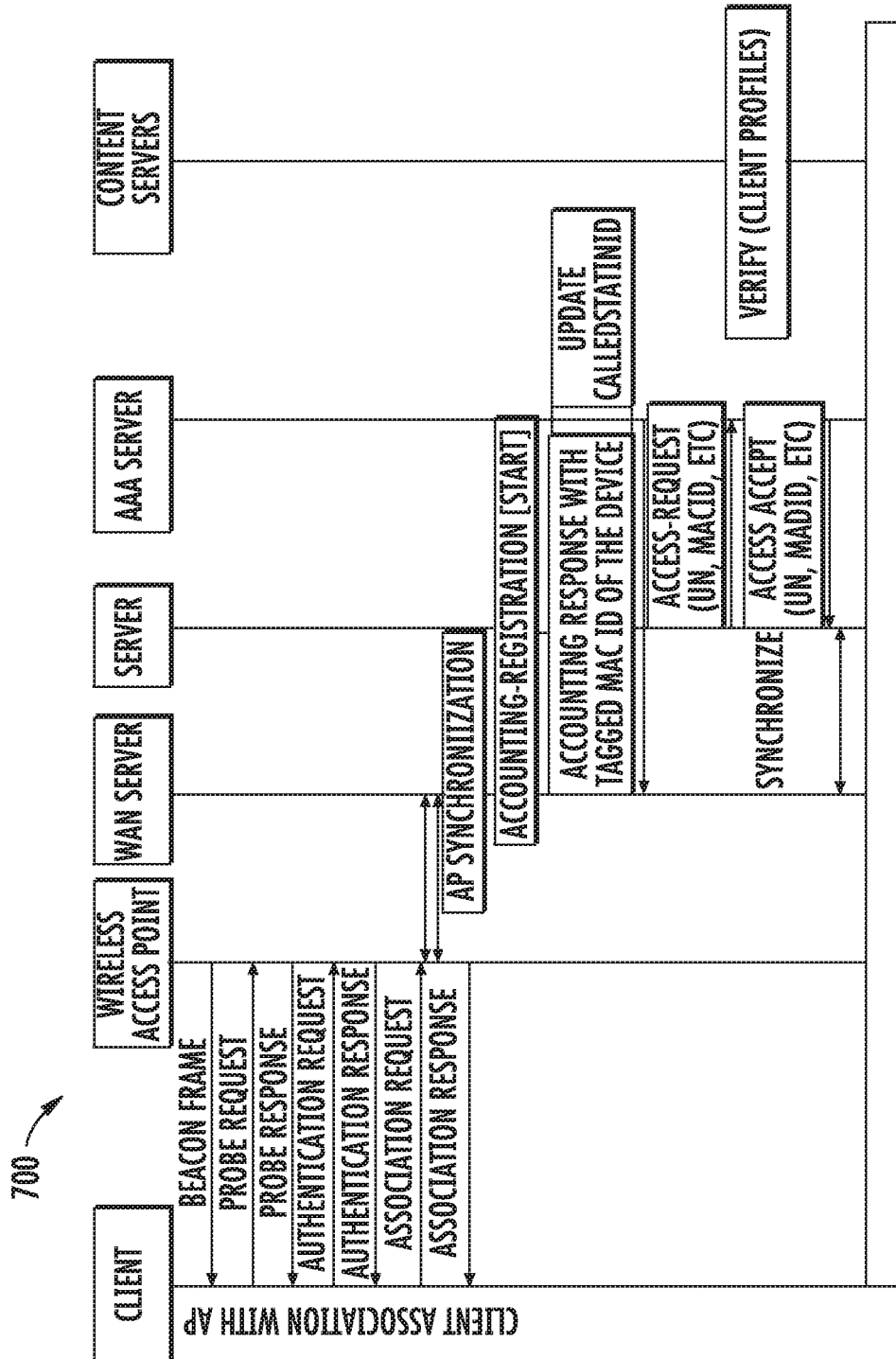
FIG. 7 is logical "ladder" representation of an exemplary call flow of a selectable data network access system useful in conjunction with various principles described herein.

FIG. 7 is a schematic diagram illustrating an example "call" flow 700 (including exemplary methods 400, 500, and 600) in the context of the MSO CDN and associated WLAN architecture of FIGS. 1-2.

In another example methodology, the WAP controller 244 (i.e., controller apparatus) the set of formal statements of the WAP policy server in its memory 304. Thus, the memory 304 may include storing at least a first user status associated with a first permissible bandwidth consumption and a second user status associated with a second permissible bandwidth consumption. The processor 302 of the WAP controller 244 is configured to execute a computer program (including non-transitory computer readable instructions) that cause the WAP controller 244 to: receive a request for connection from an end-user device 202 and determine if the requesting end-user device is associated with the first user status (e.g., located in a higher priory region, associated with a higher access pass, of a higher bandwidth consumption device class, and/or uses a higher bandwidth consumption application, etc.) or the second user status (e.g., located in a lower priory region, associated with a lower access pass, of a lower bandwidth consumption device class, and/or uses a lower bandwidth consumption application, etc.).

If the WAP controller 244 determines that the end-user device 202 meets criteria for the first user status, the end-user device is assigned the first user status associated with the first permissible bandwidth consumption (i.e., a higher permissible bandwidth consumption) and is provided access to the network 204 based on the first permissible bandwidth consumption. Thus, the end-user device 202, in this instance, is a higher priority user and has greater access to the network 204 (e.g., access including low latency, high throughput, and/or isochronous data transmission, etc.) than other users.

Alternatively, if the WAP 244 determines that the end-user device 202 meets criteria for the second user status, the end-user device is assigned with second user status associated with the second permissible bandwidth consumption (i.e., a lower permissible bandwidth consumption) and is provided access to the network 204 based on the second permissible bandwidth consumption. Thus, the end-user device 202, in this instance, is a lower priority user and has less access to the network 204 (e.g., access including high latency, low throughput, and/or asynchronous data transmission, etc.) than other higher priority users. It will be appreciated that in examples including a third user status associated with a medial permissible bandwidth consumption, a similar method may be carried out to determine if an end-user device meets criteria for the third user status and provide network access to the end-user device based on the medial permissible bandwidth consumption.

For purposes of further illustration, specific use cases for the "selectable" data network access systems and methods are now described in reference to the venues 800 and 900 shown in FIGS. 8 and 9, respectively.

Example Location/Venue Uses Cases

FIG. 8 shows a first example venue 800 (i.e., auditorium) where the selectable network access system architecture 200 may be implemented. The venue 800 includes a stage 802 (e.g., a performance stage, a conference stage, etc.), a priority seating area 804 (e.g., a seating area for VIP and/or members of the media) and a general seating area 806. Two of the wireless access points (WAPs) 246*a* are located proximate to the priority seating area 804, while three of WAPs 246*c* are located proximate to the general seating area 806. Therefore, the end-user devices 202*a* are within the wireless local area network (LAN) range of WAPs 246*a* and the end-user devices 202*c* are within the wireless LAN range of WAPs 246*c*.

In one example, when requesting network access, the user devices 202*a* may be associated with a higher access pass and/or a location (i.e., a higher priority region) of the venue, such as may be determined by a unique identifier (e.g., MAC address) or other data of the particular WAP 246*a* with which the user device associates. Thus, a first user status may be assigned to the user devices 202*a* in order to provide network access according to the first policy (e.g., higher permissible bandwidth consumption). Further, the type and/or classification of the end-user device can be detected by the system 200, and the specific end-user device 202*a* can be assigned a greater permissible bandwidth (i.e., greater than the higher permissible bandwidth associated with the first user status). For example, an 802.11g-compliant device may have less upstream bandwidth capability by virtue of e.g., its air interface configuration, such as selected modulation/coding scheme, use or absence of diversity antennae, etc., as compared to say another user's 802.11AC -compliant device. By correlating the MAC address of the particular user device, the network 200 can detect situations where additional allocations of e.g., upstream bandwidth will be useless to the end user based on the physical limitations of that user's device. Hence, in one variant, a given MSO subscriber or user registers their end-user devices on an individual basis, such registration including provision (or e.g., automated discovery of) the hardware/firmware/software configuration of the given device along with it MAC address. Accordingly, the AAA or other MSO network entity can, upon receiving a request initiated from the end-user device, not only associate the user status (e.g., available bandwidth to be allocated) with that MAC, but also apply one or more logical policies thereto, such as allocation of bandwidth by the WAP/WAP controller only to the "physical" limits of the specific user device. In this fashion, no WAP/network bandwidth is "stranded" within individual subscriber requests for service, wherein such requests can never feasibly use all of the bandwidth allocated to them.

Additionally or alternatively, the type and/or classification of the end-user device application can be detected by the system 200, and the specific end-user device 202*a* can be assigned a given policy based thereon (e.g., greater permissible bandwidth). For example, two identical pieces of user equipment might run different application layer software or processes (e.g., FTP, HTTP, etc.), utilize different peripherals or media devices, etc. such that one type of application requires greater bandwidth resources than the other. Consider for example a streaming HD or 4K quality video encoding application used by a press member to generate and upload video content (for e.g., a news story) would be allocated more bandwidth or other resources than an audio-only press member performing an audio interview for a radio station, regardless of the fact that the hardware platforms that the different users were utilizing are identical.

The present disclosure also contemplates signaling to the end user device (such as initiated at the WAP controller) to modify or adjust its upload behavior, such as e.g., "clamping" bit rate on its codecs to a constant bit rate, so as to obviate allocating bandwidth for (comparatively) limited instances where the codec demands a high "peak" bit rate, but otherwise remains well below that peak.

Further, when requesting network access, the user devices 202*c* may be associated with a lower access pass and/or a location (i.e., a lower priority region) of the user devices, which may be determined by a unique identifier (e.g., MAC address) of the WAPs 246*c*. Thus, a second user status may be assigned to the user devices 202*c* in order to provide network access according to a second permissible bandwidth consumption or other feature. Further, as noted above, the type and/or classification of the end-user device can be detected by the system 200, and the specific end-user device 202*c* can be assigned a greater permissible bandwidth (i.e., greater than the lower permissible bandwidth associated with the second user status). Additionally or alternatively, the type and/or classification of the end-user device application can be detected by the system 200 and the specific end-user device 202*c* can be allocated resources based thereon.

Hence, as noted in the examples above, there can be several sub-classifications within any given tier of service if desired, and moreover, several different combinations of bases on which the user access privileges are determined (e.g., user device MAC (and user authentication) only, user device MAC (and authentication) and location within the venue, location (and user authentication) only, and so forth).

FIG. 9 shows a second exemplary venue 900 (i.e., a sports arena) where the system architecture 200 of FIG. 2 may be employed. The venue 900 includes a sport play area 902 (e.g., a football field, a basketball court, etc.), a media member seating area 904, a VIP seating area 906, and a general seating area 908. Two of the WAPs 246*a* are located proximate to the media member seating area 904, while several of the WAPs 246*b* are located proximate to the VIP seating area 906 and several of the WAPs 246*c* are located proximate to general seating area 908. Therefore, the end-user devices 202*a* are within the wireless LAN range of WAPs 246*a*, the end-user devices 246*b* are within the wireless LAN range of WAPs 246*b*, and the end-user devices 202*c* are within the wireless LAN range of WAPs 246*c*.

In one example, when requesting network access, the user devices 202*a* may be associated with a higher access pass and/or a location (i.e., a higher priority region) which may be determined by a unique identifier (e.g., MAC address) of the WAPs 246*a*. Thus, a first user status may be assigned to the user devices 202*a* in order to provide network access according to the first permissible bandwidth consumption (such as a higher permissible bandwidth consumption). Further, as noted above, the type and/or classification of the end-user device can be detected by the system 200 and the specific end-user device 202*a* can be assigned a greater permissible bandwidth (such as a value greater than the higher permissible bandwidth associated with the first user status). Additionally or alternatively, the type and/or classification of the end-user device application can be detected by the system 200 and the specific end-user device 202*a* can be assigned a greater permissible bandwidth.

Further, when requesting network access, the user devices 202*c* may be associated with a lower access pass and/or a location (i.e., a lower priority region) of the user devices may be determined by a unique identifier (e.g., MAC address) of the WAPs 246c. Thus, a second user status may be assigned to the user devices 202c in order to provide network access according to the second permissible bandwidth consumption (i.e., a lower permissible bandwidth consumption). Further, the type and/or classification of the end-user device can be detected by the system 200 and the specific end-user device 202c can be assigned a greater permissible bandwidth (i.e., greater than the lower permissible bandwidth associated with the second user status). Additionally or alternatively, the type and/or classification of the end-user device application can be detected by the system 200 and the specific end-user device 202c can be assigned a greater permissible bandwidth (i.e., greater than the lower permissible bandwidth associated with the second user status).

Furthermore, when requesting network access, the user devices 202b may be associated with a medial access pass and/or a location (i.e., a medial priority region) of the user devices may be determined by a unique identifier (e.g., MAC address) of the WAPs 246b. Thus, a third user status may be assigned to the user devices 202b in order to provide network access according to a third permissible bandwidth consumption (i.e., a medial permissible bandwidth consumption). Further, as previously noted, the type and/or classification of the end-user device can be detected by the system 200 and the specific end-user device 202b can be assigned a greater permissible bandwidth (i.e., greater than the medial permissible bandwidth associated with the third user status). Additionally or alternatively, the type and/or classification of the end-user device application can be detected by the system 200 and the specific end-user device 202b can be assigned a greater permissible bandwidth (i.e., greater than the medial permissible bandwidth associated with the third user status).

It is recognized that in certain use cases, "conflicts" may arise, such as where a given user device is within wireless range of two or more WAPs simultaneously, while none-the-less being located in the prescribed area of interest (e.g., VIP seating or Press Box of FIG. 8). This situation can result from the overlap of wireless signals from two or more WAPs at the location. Hence, a user's device may simultaneously indicate two or three separate WAPS (e.g., "Time Warner Access Point-Press", and "Time Warner Access Point-Audience", or the like). These two or more WAPs may also be heterogeneous in service capability, such as where only the "Time Warner Access Point-Press" is enabled for enhanced uplink bandwidth. Indicated signal strengths (e.g., RSSI or the like) may also be roughly equal in certain cases, thereby not making one advertised WAP more attractive to the user than the other. Hence, the (untrained) Press Box user might inadvertently select the non-enabled WAP, and accordingly artificially limit themselves to non-enhanced service.

Accordingly, in one embodiment of the present disclosure, the "enhanced" WAP in the foregoing example is configured to advertise itself to prospective clients as "Enhanced", "High Bandwidth", "VIP" or the like, thereby tending to cause the user to select it over other possibilities.

In another embodiment, the user's device may be equipped with an "app" (e.g., for the appropriate operating system of the mobile or user device, such as Android or Microsoft O/S) authored or provided by the MSO for download onto the user's device such that it can intelligently screen WAPs within the venue. For instance, in one variant, the app can be configured to allow the user device to locate itself (e.g., via GPS receiver of the mobile device) and determine which of a plurality of WAPs within range of the mobile device at that location is appropriate for the user at that location (e.g., a "VIP" or press user located in a press box would only want to utilize the enhanced WAP, so as to e.g., enable high-bandwidth uploads). In another variant, the app is configured to display a graphical or other representation of the venue (such as may be provided automatically to the app from the WAP controller via a WAP, or by other means such as a link to a third-party mapping service such as a Google™ indoor maps API) such that the user can merely select their actual location by, e.g., touching their capacitive touch screen in an appropriate location, to "anchor" their mobile device and allow for determination of the best WAP option for the user, given their privileges for enhanced access (or lack thereof).

In yet another variant, the WAPs can be used to provide positioning location data such as via "time of flight" (TOF) or similar calculations based on reception of wireless signals from the user's device at two or more of the WAPs. In this fashion, the user's location can be used by the WAP controller to "map" the user into a known region for which enhanced service is to be provided (e.g., VIP or press box), and force the association with the enhanced-capability WAP, such as by disabling association by the particular user device (based on e.g., MAC address) with any other WAPs in the WLAN for at least a period of time. In this fashion, no app or other user device-side functions or processes need be employed; the WLAN automatically forces the user to the correct (i.e., highest bandwidth) WAP that is in range.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

Moreover, it is appreciated that each of the foregoing set of steps or methods are such that they may be readily reduced to one or more computer programs by those of ordinary skill given the present disclosure.

Additionally, while the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method of providing wireless local area network (WLAN)-based services to a plurality of user devices within a prescribed location, the WLAN comprising one or more wireless access points (WAPs), the method comprising:
    enabling receipt, at the WLAN via at least one of the one or more WAPs, of (i) data indicative of a first request for access to a content distribution and delivery network from a first user device of the plurality of user devices, and (ii) data indicative of the first user device being associated with a first classification;
    receiving, at a network entity from the at least one of the one or more WAPs, (i) the data indicative of the first request, and (ii) the data indicative of the first user device being associated with the first classification;
    determining, via the network entity, data indicative of a first privilege of the first user device within the WLAN based at least in part on the data indicative of the first user device being associated with the first classification;
    utilizing the data indicative of the first privilege to selectively cause application of at least one first WLAN access policy with respect to the first user device; and
    causing application of at least one second WLAN access policy to one or more others of the plurality of user devices;
    wherein the at least one first WLAN access policy comprises an enhanced WLAN service as compared to the at least one second WLAN access policy.

2. The method of claim 1, wherein the network entity comprises a computerized entity in data communication with a database of classification data; and
    wherein the method further comprises:
        detecting, via the network entity, the first classification; and
        identifying, via the network entity, that the data indicative of the first privilege is associated with the first classification from the database of classification data.

3. The method of claim 2, wherein the detecting of the first classification comprises detecting that a first end user application running on the first user device is of a higher bandwidth consumption class, the first end user application of the higher bandwidth consumption class configured to consume a greater amount of available bandwidth than a second end user application of a lower bandwidth consumption class.

4. The method of claim 3, wherein the first end user application of the higher bandwidth consumption class comprises a High Definition (HD) or 4K quality video encoding application configured for uploading of video content, and the second end user application of the lower bandwidth consumption class comprises an audio encoding application configured for uploading or downloading of audio content only.

5. The method of claim 3, further comprising:
    subsequently detecting that the first user device is (i) disassociated with the first classification, and (ii) associated with a second classification; and
    based at least in part on the disassociation with the first classification and the association with the second classification:
        causing termination of the application of the at least one first WLAN access policy to the first user device, and
        causing application of the at least one second WLAN access policy to the first user device.

6. The method of claim 1, wherein the data indicative of the first user device being associated with the first classification comprises data indicative of the first user device being of a prioritized user class associated with a prescribed area or location within a venue.

7. The method of claim 1, wherein the data indicative of the first user device being associated with the first classification comprises data indicative of the first user device being of a higher bandwidth consumption device classification, the first user device being configured to consume a greater amount of available bandwidth than a second user device of a lower bandwidth consumption device classification.

8. The method of claim 7, wherein the first user device comprises a device having a first wireless air interface configuration, and the second user device comprises a device having a second wireless air interface configuration, the second air interface configuration having one or more features that enhance at least one of upstream or downstream data rate, the first wireless air interface configuration not having the one or more features.

9. The method of claim 8, wherein the one or more features comprise spatial diversity processing capability.

10. The method of claim 1, wherein the utilizing the data indicative of the first privilege to selectively cause the application of the at least one first WLAN access policy with respect to the first user device comprises:
    providing the data indicative of the first privilege of the first user device to a computerized controller entity in data communication with the at least one of the one or more WAPs;
    utilizing the provided data indicative of the first privilege of the first user device within one or more of the at least one of the one or more WAPs and the computerized controller entity to correlate the provided data indicative of the first privilege of the first user device with the at least one first WLAN access policy;
    subsequently identifying a plurality of user-plane data associated with the first user device; and
    handling the identified plurality of user-plane data according to the at least one first WLAN access policy.

11. The method of claim 10, wherein the handling the identified plurality of user-plane data according to the at least one first WLAN access policy comprises providing the plurality of user-plane data a higher service priority to an available data communications bandwidth of the WLAN than other user-plane data within the WLAN.

12. The method of claim 10, wherein the handling the identified plurality of user-plane data according to the at least one first WLAN access policy comprises reserving a prescribed portion of an available data communications bandwidth of the WLAN for use by the first user device.

13. A computerized controller apparatus comprising:
    digital processor apparatus configured for data communication with at least a digital data storage apparatus, the digital data storage apparatus configured to store at least user status data, the user status data comprising one or more of (i) data indicative of a first user status associated with a first permissible bandwidth consumption, or (ii) data indicative of a second user status associated with a second permissible bandwidth consumption, the second permissible bandwidth consumption being less than the first permissible bandwidth consumption;
    a first data interface in data communication with the digital processor apparatus and configured for signal communication with a local area wireless network;

a second data interface in data communication with the digital processor apparatus and configured for signal communication with a computerized network entity of a managed content delivery network (CDN); and a non-transitory computer-readable storage apparatus having at least one computer program stored thereon, the at least one computer program comprising a plurality of computer readable instructions which are configured to, when executed by the digital processor apparatus, cause the computerized controller apparatus to:

receive data indicative of a first connection request from a first user device via said first data interface;

detect a first end user application computer program running on the first user device, the first end user application computer program being of a first bandwidth consumption class relative to a prescribed standard;

based at least in part on the detection of the first end user application computer program, determine that the first user device is associated with the data indicative of the first user status;

based at least in part on the association of the first user device with the data indicative of the first user status, assign the first permissible bandwidth consumption to the first user device; and enable access to the managed CDN via the second data interface for the first user device consistent with the first permissible bandwidth consumption.

14. The computerized controller apparatus of claim 13, wherein the plurality of computer readable instructions are further configured to, when executed by the digital processor apparatus, cause the computerized controller apparatus to:

receive data indicative of a second connection request from a second user device via said first data interface;

detect a second end user application computer program running on the second user device, the second end user application computer program being of a second bandwidth consumption class relative to the prescribed standard;

based at least in part on the detection of the second end user application computer program, determine that said second user device is associated with the data indicative of said second user status;

based at least in part on the association of said second user device with the data indicative of said second user status, assign said second permissible bandwidth consumption to said second user device; and enable access to said managed CDN via said second data interface for said second user device consistent with said second permissible bandwidth consumption.

15. The computerized controller apparatus of claim 13, wherein the plurality of computer readable instructions are further configured to, when executed by the digital processor apparatus, cause the computerized controller apparatus to:

subsequently detect that the first end user application computer program has terminated running on the first user device;

based at least in part on the detection of the termination of the first end user application computer program, determine that the first user device is associated with the data indicative of the second user status;

based at least in part on the association of the first user device with the data indicative of the second user status, assign the second permissible bandwidth consumption to the first user device; and enable access to the managed CDN via the second data interface for the first user device consistent with the second permissible bandwidth consumption.

16. The computerized controller apparatus of claim 13, wherein the digital data storage apparatus is further configured to store a plurality of end user application computer programs and classification data correlated to the user status data; and the determination that the first user device is associated with the data indicative of the first user status based at least in part on the detection of the first end user application computer program comprises access of at least a portion of the plurality of end user application computer programs and the classification data to identify that the first user status is correlated with the first end user application computer program.

17. A computerized controller apparatus comprising:
digital processor apparatus;

a first data interface in data communication with the digital processor apparatus and configured for signal communication with one or more wireless local area network (WLAN) access points;

a second data interface in data communication with the digital processor apparatus and configured for signal communication with a network entity of a managed content delivery network (CDN); and a non-transitory computer-readable storage apparatus in data communication with the digital processor apparatus and having at least one computer program stored thereon, the at least one computer program comprising a plurality of computer readable instructions which are configured to, when executed by the digital processor apparatus, cause the computerized controller apparatus to:

receive data indicative of a first service request from a first user device via said first data interface, the first service request comprising at least first end user application-specific identifier data associated with the first user device; and utilize at least a portion of the data indicative of the first service request to authenticate, within the managed CDN, the first user device as having a first privilege enabled via at least a first one of the one or more WLAN access points, the first privilege comprising data indicative of a greater permissible bandwidth than a permissible bandwidth of a second privilege associated with one or more other user devices.

18. The computerized controller apparatus of claim 17, wherein the one or more WLAN access points are associated with a first common venue or entity, and the computerized controller apparatus is configured to control, via at least the first data interface, one or more other WLAN access points associated with a second common venue or entity different than the first common venue or entity.

19. The computerized controller apparatus of claim 17, wherein the plurality of computer readable instructions are further configured to, when executed by the digital processor apparatus, cause the computerized controller apparatus to:

receive, from the first user device, data relating to a geographic location or position of the first user device;

based at least on the data relating to the geographic location or position of the first user device, correlate the data relating to the geographic location or position of the first user device with one of a plurality of designated areas or regions within a venue served by the one or more wireless local area network (WLAN) access points; and configure at least a portion of the first privilege based on the correlated one of the plurality of designated areas or regions.

20. The computerized controller apparatus of claim 19, wherein the configuration of the at least portion of the first privilege based on the correlated one of the plurality of designated areas or regions comprises configuration based at least in part on the one of the plurality of designated areas or regions comprising an area or region exceeding a prescribed threshold of WLAN user density.

\* \* \* \* \*